(12) United States Patent
Alameh et al.

(10) Patent No.: US 9,063,591 B2
(45) Date of Patent: Jun. 23, 2015

(54) ACTIVE STYLUSES FOR INTERACTING WITH A MOBILE DEVICE

(75) Inventors: Rachid M Alameh, Crystal Lake, IL (US); John Henry Krahenbuhl, McHenry, IL (US); Thomas Y Merrell, Beach Park, IL (US); Jiri Slaby, Buffalo Grove, IL (US); David P Winkler, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 52 days.

(21) Appl. No.: 13/307,962

(22) Filed: Nov. 30, 2011

(65) Prior Publication Data

US 2013/0135220 A1  May 30, 2013

(51) Int. Cl.
*G06F 3/033* (2013.01)
*G06F 3/038* (2013.01)
*G06F 3/041* (2006.01)
*G06F 3/0354* (2013.01)

(52) U.S. Cl.
CPC .............. *G06F 3/0383* (2013.01); *G06F 3/041* (2013.01); *G06F 3/03545* (2013.01); *G06F 2203/04105* (2013.01)

(58) Field of Classification Search
None
See application file for complete search history.

(56) References Cited

U.S. PATENT DOCUMENTS

| | | |
|---|---|---|
| 4,139,854 A | 2/1979 | Walker |
| 4,654,648 A | 3/1987 | Herrington et al. |
| 5,179,369 A | 1/1993 | Person et al. |
| 5,684,294 A | 11/1997 | Kouhi |
| 5,693,914 A | 12/1997 | Ogawa |
| 5,736,687 A * | 4/1998 | Sellers ....................... 178/18.03 |
| 5,781,662 A | 7/1998 | Mori et al. |
| 5,821,521 A | 10/1998 | Bridgelall et al. |
| 5,913,629 A | 6/1999 | Hazzard |
| 5,945,980 A | 8/1999 | Moissev et al. |
| 5,945,988 A | 8/1999 | Williams et al. |
| 5,956,020 A | 9/1999 | D'Amico et al. |
| 6,002,427 A | 12/1999 | Kipust |

(Continued)

FOREIGN PATENT DOCUMENTS

| | | |
|---|---|---|
| EP | 1445922 A1 | 8/2004 |
| EP | 1657819 A2 | 5/2006 |

(Continued)

OTHER PUBLICATIONS

United States Patent and Trademark Office, "Non-Final Office Action" for U.S. Appl. No. 12/773,461 dated Aug. 8, 2012, 9 pages.

(Continued)

*Primary Examiner* — Quan-Zhen Wang
*Assistant Examiner* — Chad Dicke
(74) *Attorney, Agent, or Firm* — Shumaker & Sieffert, P.A.

(57) ABSTRACT

An active stylus or a method performed by an active stylus for interacting with a mobile device, wherein the mobile device has at least one sensor (e.g., a thermocouple junction), and wherein the stylus has at least one signal source (e.g., an analog heat source) that produces at least one signal (e.g., at least one analog temperature signal), wherein the at least one signal is configured to be detectable by the at least one sensor of the mobile device. The stylus also has at least one signal adjustment mechanism for changing the at least one signal and also has at least one transmitter (e.g., thermocouple junction) configured to transmit the at least one signal for receipt by the at least one sensor of the mobile device.

15 Claims, 18 Drawing Sheets

(56) References Cited

U.S. PATENT DOCUMENTS

| | | | |
|---|---|---|---|
| 6,107,994 A | 8/2000 | Harada et al. | |
| 6,133,906 A | 10/2000 | Geaghan | |
| 6,175,773 B1 | 1/2001 | Reiffel et al. | |
| 6,184,538 B1 | 2/2001 | Bandara et al. | |
| 6,246,862 B1 | 6/2001 | Grivas et al. | |
| 6,292,674 B1 | 9/2001 | Davis | |
| 6,330,457 B1 | 12/2001 | Yoon | |
| 6,396,481 B1 | 5/2002 | Challa et al. | |
| 6,438,752 B1 | 8/2002 | McClard | |
| 6,460,183 B1 | 10/2002 | Van Der Vleuten | |
| 6,525,854 B1 | 2/2003 | Takahashi et al. | |
| 6,550,997 B1 | 4/2003 | King et al. | |
| 6,721,954 B1 | 4/2004 | Nickum | |
| 6,729,547 B1 | 5/2004 | Charlier et al. | |
| 6,749,354 B2 | 6/2004 | Kageyama et al. | |
| 6,804,012 B2 | 10/2004 | Gombert | |
| 6,812,685 B2 | 11/2004 | Steber et al. | |
| 6,816,154 B2 | 11/2004 | Wong et al. | |
| 6,867,765 B2 | 3/2005 | LeKuch et al. | |
| 6,933,922 B2 | 8/2005 | Casebolt et al. | |
| 6,941,161 B1 | 9/2005 | Bobisuthi et al. | |
| 6,952,203 B2 | 10/2005 | Banerjee et al. | |
| 7,046,230 B2 | 5/2006 | Zadesky et al. | |
| 7,077,594 B1 | 7/2006 | Annerino et al. | |
| 7,134,092 B2 | 11/2006 | Fung et al. | |
| 7,166,966 B2 | 1/2007 | Naugler, Jr. et al. | |
| 7,212,835 B2 | 5/2007 | Mantyjarvi et al. | |
| 7,236,161 B2 | 6/2007 | Geaghan et al. | |
| 7,340,077 B2 | 3/2008 | Gorturk et al. | |
| 7,368,703 B2 | 5/2008 | De Samber et al. | |
| 7,380,716 B2 | 6/2008 | Yokoyama | |
| 7,468,689 B2 | 12/2008 | Ma et al. | |
| 7,477,242 B2 | 1/2009 | Cross et al. | |
| 7,486,386 B1 | 2/2009 | Holcombe et al. | |
| 7,489,308 B2 | 2/2009 | Blake et al. | |
| 7,519,918 B2 | 4/2009 | Trantow | |
| 7,532,196 B2 | 5/2009 | Hinckley | |
| 7,534,988 B2 | 5/2009 | Kong et al. | |
| 7,567,242 B2 | 7/2009 | Perkins et al. | |
| 7,612,767 B1 | 11/2009 | Griffin et al. | |
| 7,630,716 B2 | 12/2009 | Tamura et al. | |
| 7,646,377 B2 | 1/2010 | Geaghan | |
| 7,685,538 B2 | 3/2010 | Fleck et al. | |
| 7,715,036 B2 | 5/2010 | Silverbrook et al. | |
| 7,719,515 B2 | 5/2010 | Fujiwara et al. | |
| 7,721,310 B2 | 5/2010 | Schaffer et al. | |
| 7,794,167 B2 | 9/2010 | Lapstun et al. | |
| 7,855,716 B2 | 12/2010 | McCreary et al. | |
| 7,889,186 B2 | 2/2011 | Nishimura et al. | |
| 8,030,914 B2 | 10/2011 | Alameh et al. | |
| 8,031,177 B2 | 10/2011 | Lapstun et al. | |
| 2001/0006383 A1 | 7/2001 | Fleck et al. | |
| 2001/0019338 A1 | 9/2001 | Roth | |
| 2002/0040817 A1 | 4/2002 | LeKuch et al. | |
| 2002/0074403 A1* | 6/2002 | Krichever et al. | 235/454 |
| 2002/0080123 A1 | 6/2002 | Kennedy et al. | |
| 2002/0104081 A1 | 8/2002 | Candelore et al. | |
| 2002/0122072 A1 | 9/2002 | Selker | |
| 2002/0199186 A1 | 12/2002 | Ali et al. | |
| 2003/0063128 A1 | 4/2003 | Salmimaa et al. | |
| 2003/0118391 A1 | 6/2003 | Adams | |
| 2003/0222917 A1 | 12/2003 | Trantow | |
| 2005/0104860 A1 | 5/2005 | McCreary et al. | |
| 2005/0150697 A1 | 7/2005 | Altman et al. | |
| 2005/0232447 A1 | 10/2005 | Shinozuka et al. | |
| 2005/0289182 A1 | 12/2005 | Pandian et al. | |
| 2006/0010400 A1 | 1/2006 | Dehlin et al. | |
| 2006/0028453 A1 | 2/2006 | Kawabe | |
| 2006/0031786 A1 | 2/2006 | Hillis et al. | |
| 2006/0049152 A1 | 3/2006 | Matus | |
| 2006/0125799 A1 | 6/2006 | Hillis et al. | |
| 2006/0132456 A1 | 6/2006 | Anson | |
| 2006/0161870 A1 | 7/2006 | Hotelling et al. | |
| 2006/0161871 A1 | 7/2006 | Hotelling et al. | |
| 2006/0256074 A1 | 11/2006 | Krum et al. | |
| 2006/0267580 A1* | 11/2006 | Fukushima et al. | 324/207.13 |
| 2006/0273696 A1* | 12/2006 | Toda | 310/348 |
| 2007/0106172 A1 | 5/2007 | Abreu | |
| 2007/0137462 A1 | 6/2007 | Barros et al. | |
| 2007/0150842 A1 | 6/2007 | Chaudhri et al. | |
| 2007/0177803 A1 | 8/2007 | Elias et al. | |
| 2007/0180392 A1 | 8/2007 | Russo | |
| 2007/0205996 A1 | 9/2007 | Huang | |
| 2007/0220437 A1 | 9/2007 | Boillot | |
| 2007/0242056 A1 | 10/2007 | Engelhardt et al. | |
| 2007/0247643 A1 | 10/2007 | Nakamura et al. | |
| 2008/0005703 A1 | 1/2008 | Radivojevic et al. | |
| 2008/0006762 A1 | 1/2008 | Fadell et al. | |
| 2008/0024454 A1 | 1/2008 | Everest | |
| 2008/0030486 A1 | 2/2008 | Cook | |
| 2008/0052643 A1 | 2/2008 | Ike et al. | |
| 2008/0079902 A1 | 4/2008 | Mandelstam-Manor et al. | |
| 2008/0122803 A1 | 5/2008 | Izadi et al. | |
| 2008/0129688 A1 | 6/2008 | Richardson et al. | |
| 2008/0161870 A1 | 7/2008 | Gunderson | |
| 2008/0165140 A1 | 7/2008 | Christie et al. | |
| 2008/0192005 A1 | 8/2008 | Elogyhen et al. | |
| 2008/0195735 A1 | 8/2008 | Hodges et al. | |
| 2008/0204427 A1 | 8/2008 | Heesemans et al. | |
| 2008/0211771 A1 | 9/2008 | Richardson | |
| 2008/0219672 A1 | 9/2008 | Tam et al. | |
| 2008/0225041 A1 | 9/2008 | El Dokor et al. | |
| 2008/0240568 A1 | 10/2008 | Tonouchi | |
| 2008/0252595 A1 | 10/2008 | Boillot | |
| 2008/0256494 A1 | 10/2008 | Greenfield | |
| 2008/0266083 A1 | 10/2008 | Midholt et al. | |
| 2008/0280642 A1 | 11/2008 | Coxhill et al. | |
| 2008/0284743 A1 | 11/2008 | Hsu et al. | |
| 2008/0284753 A1 | 11/2008 | Hsu et al. | |
| 2008/0297487 A1 | 12/2008 | Hotelling et al. | |
| 2008/0303681 A1 | 12/2008 | Hertz et al. | |
| 2008/0309641 A1 | 12/2008 | Harel et al. | |
| 2009/0006991 A1 | 1/2009 | Lindberg et al. | |
| 2009/0031258 A1 | 1/2009 | Arrasvouri et al. | |
| 2009/0061823 A1 | 3/2009 | Chu | |
| 2009/0092284 A1 | 4/2009 | Breed et al. | |
| 2009/0158203 A1 | 6/2009 | Kerr et al. | |
| 2009/0236153 A1* | 9/2009 | Kyung et al. | 178/19.01 |
| 2009/0299633 A1 | 12/2009 | Hawes et al. | |
| 2009/0303176 A1 | 12/2009 | Chen et al. | |
| 2010/0006350 A1 | 1/2010 | Elias | |
| 2010/0167783 A1 | 7/2010 | Alameh et al. | |
| 2010/0177121 A1 | 7/2010 | Homma et al. | |
| 2010/0271312 A1 | 10/2010 | Alameh et al. | |
| 2010/0271331 A1 | 10/2010 | Alameh et al. | |
| 2010/0295772 A1 | 11/2010 | Alameh et al. | |
| 2010/0295773 A1 | 11/2010 | Alameh et al. | |
| 2010/0295781 A1 | 11/2010 | Alameh et al. | |
| 2010/0297946 A1 | 11/2010 | Alameh et al. | |
| 2010/0299390 A1 | 11/2010 | Alameh et al. | |
| 2010/0299642 A1 | 11/2010 | Merrell et al. | |
| 2010/0315384 A1 | 12/2010 | Hargreaves et al. | |
| 2010/0321338 A1 | 12/2010 | Ely | |
| 2011/0006190 A1 | 1/2011 | Alameh et al. | |
| 2011/0009194 A1 | 1/2011 | Gabai et al. | |
| 2011/0072388 A1* | 3/2011 | Merrell et al. | 715/784 |
| 2011/0148752 A1 | 6/2011 | Alameh et al. | |
| 2011/0162894 A1* | 7/2011 | Weber | 178/19.03 |
| 2011/0169756 A1* | 7/2011 | Ogawa et al. | 345/173 |
| 2011/0187727 A1 | 8/2011 | Ahn et al. | |
| 2011/0267294 A1 | 11/2011 | Kildal | |
| 2011/0273376 A1 | 11/2011 | Dickinson et al. | |
| 2011/0273378 A1 | 11/2011 | Alameh et al. | |
| 2011/0297457 A1* | 12/2011 | Yeh et al. | 178/19.01 |
| 2012/0072157 A1 | 3/2012 | Alameh et al. | |
| 2012/0101245 A1* | 4/2012 | Coates et al. | 526/351 |
| 2012/0200486 A1 | 8/2012 | Meinel et al. | 345/156 |
| 2012/0293463 A1 | 11/2012 | Adhikari | |
| 2013/0135262 A1 | 5/2013 | Alameh et al. | |

FOREIGN PATENT DOCUMENTS

| | | |
|---|---|---|
| EP | 1760573 A2 | 3/2007 |
| EP | 1993025 A2 | 11/2008 |

(56) References Cited

FOREIGN PATENT DOCUMENTS

| | | |
|---|---|---|
| EP | 1993028 A1 | 11/2008 |
| EP | 2000896 A2 | 12/2008 |
| EP | 2037349 A2 | 3/2009 |
| JP | 02280427 A | 11/1990 |
| JP | 2005293419 A | 10/2005 |
| JP | 2006010489 A | 1/2006 |
| JP | 2007042020 A | 2/2007 |
| JP | 2007-183809 A | 7/2007 |
| JP | 2009085799 A | 4/2009 |
| WO | 9528777 A1 | 10/1995 |
| WO | 0241129 A2 | 5/2002 |
| WO | 03023701 A2 | 3/2003 |
| WO | 03065192 A1 | 8/2003 |
| WO | 03076870 A1 | 9/2003 |
| WO | 2005076542 A1 | 8/2005 |
| WO | 2005101176 A2 | 10/2005 |
| WO | 2007122444 A1 | 11/2007 |
| WO | 2008016394 A2 | 2/2008 |
| WO | 2008073289 A3 | 6/2008 |
| WO | 2011008533 A2 | 1/2011 |

OTHER PUBLICATIONS

United States Patent and Trademark Office, "Final Office Action" for U.S. Appl. No. 12/773,461 dated Oct. 4, 2012, 11 pages.

Bricklin, "Gestures, the iPhone, and Standards: A Developers Questions," www.bricklin.com, retrieved from http://www.bricklin.com/gestures.htm, Oct. 24, 2007, 9 pp.

Christensen, "Retrieval of 3D-Position of a Passive Object Using infrared LED's and Photodiodes," IEEE International Conference on Acoustics Speech, and Signal Processing 2005, ICASSP 05, vol. 4, Mar. 18-23, 2005, 4 pp.

"Hadamard transform," Wikipedia definition, retrieved from http://en.wikipedia.org/wikilHadamard_transform on Jan. 12, 2010, 4 pp.

Kahn et al., "Imaging Diversity Receivers for High-Speed Infrared Wireless Communication," IEEE Communications Magazine, Dec. 1998, 7 pp.

Metzger et al., "FreeDigiter: A Contact-free Device for Gesture Control," Eighth International Symposium on Wearable Computers, ISWC 2004, vol. 1, Oct. 31-Nov. 3, 2004, 4 pp.

"Microsoft's SideSight: Something Apple Should Watch," www.gearlog.com, Oct. 20, 2008, 5 pp.

Pavlov et al., "Model-based object characterization with active infrared sensor array," 2007 IEEE Sensors, Oct. 28-31, 2007, 4 pp.

"Si1120 Evaluation Kit User's Guide," Silicon Laboratories, Inc., retrieved from http://www.silabs.com/Support%20Documents/TechnicalDocs/Si1120-EK.pdf, Jul. 2013, 10 pp.

"Specification of the Bluetooth System: Master Table of Contents & Compliance Requirements; Covered Core Package V.3.0+HS," Apr. 21, 2009, 192 pp.

"Vector Expansion: True 6DOF view control offer 3-dimensional virtual reality via motion control," TRACKIR by Natural Point, retrieved from http://www.naturalpoint.com/trackir/02-products/product-how-TrackIR-works.html on Jul. 8, 2014, 2 pp.

von Hardenberg et al., "Bare-Hand Human-Computer Interaction," Proceedings of the ACM Workshop on Perceptive User Interfaces, Nov. 15-16, 2001, 8 pp.

Ward et al., "A New Location Technique for the Active Office"; IEEE Personal Communications, vol. 4, No. 5, Oct. 1997, 11 pp.

Yun et al., "Spot diffusing and fly-eye receivers for indoor infrared wireless communications", 1992 IEEE International Conference on Selected Topics in Wireless Communications, Vancouver, BC, Canada, Jun. 25-26, 5 pp.

Prosecution History from U.S. Appl. No. 13/307,967, dated Sep. 26, 2013 through Jul. 9, 2014, 94 pp.

U.S. Appl. No. 13/307,967, by Rachid M. Alameh, filed Nov. 30, 2011.

Notice of Allowance from U.S. Appl. No. 13/307,967, dated Oct. 14, 2014, 16 pp.

Slaby et al., "Dual Mode Active Stylus for Writing Both on a Capacitive Touchscreen and Paper" U.S. Appl. No. 13/426,860, filed Mar. 22, 2012, 44 pages.

IntelliPen Pro, Digital Pen & USB Flash Drive, http://www.intellipens.com/?CategoryID=182, downloaded from Internet Jun. 11, 2012, 2 pages.

Fisher Bullet Space Pen Stylus w/Clip—Chrome, http://www.styluscentral.com/shopexd.asp?id=200, downloaded from internet Jun. 11, 2012, 1 page.

Purcell, Kevin: LunaTik Touch Pen Stylus—Ballpoint Pen in an iPad Stylus Tip, GottaBe MOBILE, Mobile News & Reviews, Dec. 13, 2011, www.gottabemobile.com/2011/12/13/lunatik-tough-pen-stylus-ballpoint-pen-in-an-ipad-stylus-tip/#, all pages.

Targus 3-in-1 Stylus for Capacitive Devices, B&H, The Professional's Source, www.bhpotovideo.com/c/product/808841-REG/Targus_AMM04TBUS_3_in_1_Stylus_for_Capacitive.html, all pates, downloaded from internet Mar. 20, 2012, 200-2012- B& H Foto & Electronics Co.

More/Real Stylus Caps, http://more-real.com, 2012 More/Real LLC, downloaded from internet, Mar. 20, 2012, all pages.

Dell Axim x30 Stylus with Ballpoint Pen, http://www.cel-phone-accessories.com/aximx.30.html, 2011 Cell-Phone_accessories.com, downloaded from Internet Mar. 20, 2012, all pages.

Vuppu et al., "Active Stylus for Use with Touch-Sensitive Interfaces and Corresponding Method" U.S. Appl. No. 12/974,252, filed Dec. 21, 2010, 35 pages.

Ten One Design LLC, "The Classic Pogo Stylus", Pogo Stylus, 2010, pp. 1-17, http://www.tenonedesign.com/stylus.php.

DAGi Corporation Ltd. "iPad Stylus" electronic catalog page, http://www.dagi.com.tw/front/bin/home.phtml, printed Aug. 23, 2011, 2 pages.

WACOM, "Bamboo User's Manual for Windows & Macintosh", 2009, 90 pages.

Hansen et al., "Touchscreen Writing System" U.S. Appl. No. 13/450,906, filed Apr. 19, 2012, 25 pages.

n-Trig (http://www.ntrig.com), 1999.

HardCandy Cases, CandyStylus+Pen, http://www.hardcandycases.com/candy-ipad-stylus.html, downloaded from Internet Mar. 20, 2012, copyright 2011 HardCAndy Cases Yahoo Store Web Design by Solid Cactus, all pages.

Alameh et al., "Mobile Device for Interacting with an Active Stylus" U.S. Appl. No. 13/307,967, filed Nov. 30, 2011, 50 pages.

Dickinson et al., "Stylus Devices Having Variable Electrical Characteristics for Capacitive Touchscreens" U.S. Appl. No. 12/773,461, filed May 4, 2010.

HTC Patents Capacitive Stylus: http://pocketpc-live.com/htc/htc-magnetic-stylus.html.

Appleinsider, "Apple Looks to Improve Pen-Based Input on Tablet Touchscreens", Nov. 12, 2009, pp. 1-2, http://www.appleinsider.com/articles/09/11/12/apple_looks_to_improve_pen_based_input_on_tablet_touchscreens.html.

Patent Cooperation Treaty, "PCT Search Report and Written Opinion of the International Searching Authority" for International Application No. PCT/US2011/065713 Apr. 12, 2012, 14 pages.

* cited by examiner

US 9,063,591 B2

ACTIVE STYLUSES FOR INTERACTING WITH A MOBILE DEVICE

FIELD OF THE INVENTION

The present invention relates in general to human interaction with a mobile device, and more specifically to active styluses that interact with a mobile device and a method performed by such styluses.

BACKGROUND

Advancements in mobile devices, especially progress in touch screen technologies of mobile devices, has led to a great number of new opportunities and problems. One opportunity is the ability to provide such devices in various sizes, including pocket sizes for smart phones and slightly larger sizes for tablet computers. Additionally, progress in touch screen technologies has led to seamless interaction with a plethora of applications. Despite such progress, there have been problems with the clumsiness of such touch screens, especially on smaller mobile devices, such as smart phones. It is common for a user's finger to be too large for effective interaction with a touch screen of a smart phone, especially when icons of an application are too small or too close together. Furthermore, there are inadequacies in tactile feedback between a user and a touch screen, which especially affect users with audio and visual impairment, and there are limitations in communicating more than one type of signal between a user and a touch screen. For example, a user's finger can only convey a single tactile signal, oppose to multiple signals simultaneously. Although, conventional styluses (e.g., passive styluses) have been used to relieve the issue of clumsiness, such styluses merely provide a narrower point of contact with a touch screen than a finger. Passive styluses do not provide feedback to a user, nor can they provide multiple signals of information simultaneously. For example, there is no right-click functionality on a passive stylus.

Thus, it is desirable to provide active styluses with features to address these concerns.

DETAILED DESCRIPTION

Figure 1:
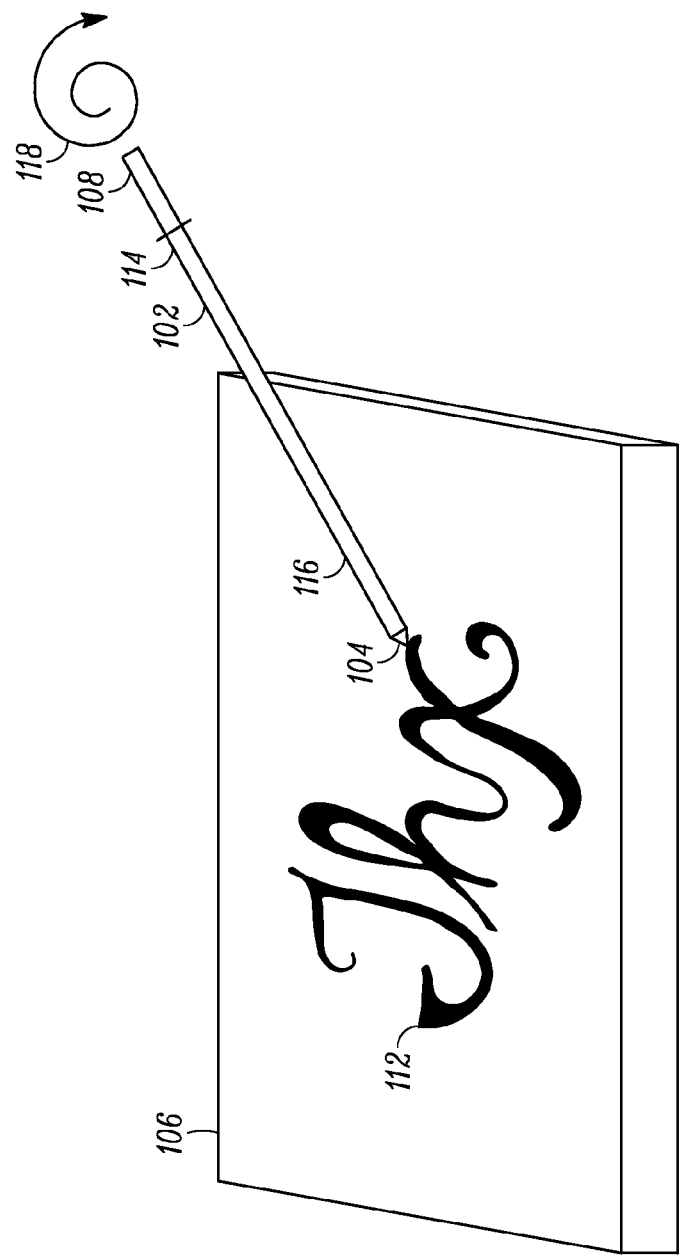
FIG. 1 depicts a stylus that is an elongate member having a first distal end configured for interacting with a touch screen shown in FIG. 15.

Disclosed herein are styluses that have at least one of a signal source and/or a receiver that can communicate with a mobile device. Additionally disclosed are methods for performing such communication. The at least one signal source can be a heat and/or temperature source and the at least one receiver can be a heat and/or temperature sensor, or the two devices can be combined into a heat and/or temperature transceiver (also referred to as a thermal transmitter, a thermal receiver, and a thermal transceiver, respectively). These thermal devices in actuality sense and/or transfer heat (also referred to as receiving and/or transmitting heat) from and/or to other devices or objects, respectively. Alternatively, the at least one signal source and receiver can be any known wireless signal transmitter, receiver, or transceiver, including wireless communication devices that communicate by way of mechanical signals (e.g., vibration patterns, acoustical signals, mechanical deformation signals), and/or electromagnetic signals (e.g., various light or radio signals). In one embodiment, the thermal transceiver is one or more thermocouple junction.

Likewise, the mobile devices that communicate with the styluses can also include a signal source and/or a receiver similar to those of the styluses. By enabling communication beyond a mere touch point between a stylus and a mobile device, the disclosed styluses and methods provide more dynamic interaction and help resolve the size and lack of feedback issues discussed prior.

Furthermore, disclosed herein are active styluses and methods performed by such styluses that, when in contact with a touch screen, can vary the signal level detected on a touch screen to create a more realistic writing experience and a more dynamic user experience. The elements of a disclosed stylus can include at least one feature to provide at least one thermal characteristic that is variable.

Further, elements of a touch screen stylus are disclosed, which individually or in combination can enable a touch screen stylus to have at least one thermal characteristic that is variable. In this way a link between the touch screen and a signal transmitting element can be varied to enable features such as a capability to vary the width of line being drawn and/or to vary a region of influence on the touch screen.

For example, the larger the signal received by the touch screen, the larger the area of the image created. That is more received signal can result in a wider line and less received signal can result in a thinner line. A user can control the signal variability by controlling where the user's finger touches the stylus. For example, coatings and/or insulators such as a rubber grip with contact slots, and/or variations in the texture of the surface of the stylus so as to reduce the skin contact area can allow the user to control the conductivity of other thermal properties of the stylus. In another embodiment, sandwiching two materials of different levels of conductivity (one stronger, one weaker) can thermally create a beveled edge device. In any of the disclosed manners, and any combinations thereof, the disclosed stylus can vary the signal level detected on a touch screen to create a more realistic writing experience and dynamic user interaction. Such occurs due to a touch sensor (e.g., movement sensing assembly) viewing the changes in a signal caused by the stylus and relate these changes to the user interface layer, and vice versa.

In one embodiment, a signal variation can be enabled depending on where the stylus is held. A combination of elements can include segmented/laminated/variable in axial construction to provide longitudinal variation; segments in resistor series to provide linear gradients; segments in series/parallel combinations to provide linear/non-linear profiles; rheostat-like resistor windings with one or more slidable indexing collars; and rheostat-like resistor windings with one or more screwable indexing collars. In another embodiment, additionally, or in the alternative to where the stylus is held, a resistive link variation can be enabled depending on how the stylus is held. A combination of elements can include, surface roughness elements which can include varying density and height to vary contact resistance, segmented/laminated in lengthwise construction to provide rotational variation and replaceable tips of varying geometry.

Figure 14:
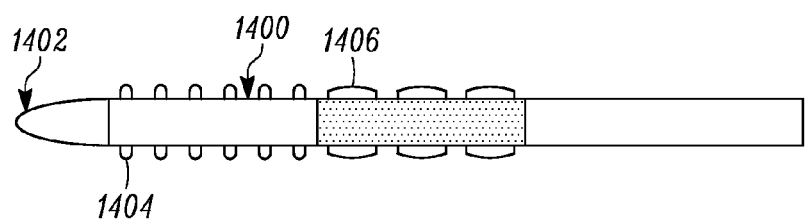
Figure 15:
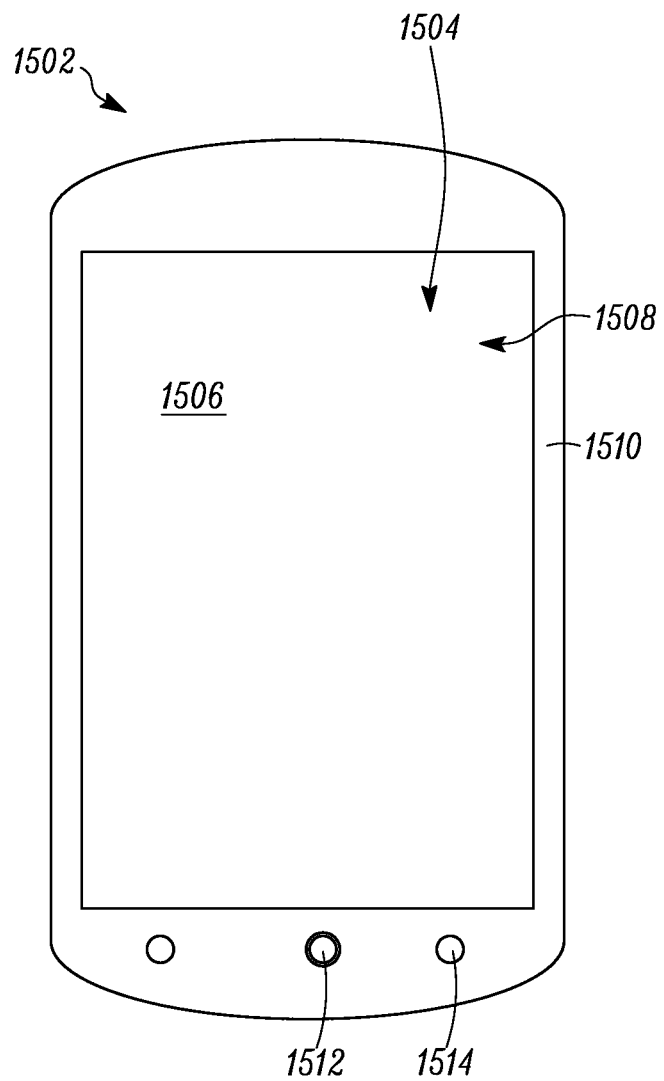
FIG. 15 is a front perspective view of an example touch screen device.

Referring to FIGS. 1, 2, and 4-14, the figures depict various examples of active styluses that are capable of interacting with a touch screen 1506 or other components of the mobile device 1502 as shown in FIG. 15. Although, the active styluses of FIGS. 1, 2, and 4-14 for the most part communicate with the mobile device 1502 through a temperature or heat signal, it should be understood that in alternative embodiments of the styluses and the mobile device, interaction can occur through the communication of other forms of signals as mentioned above.

FIG. 1 depicts a stylus 102 that is an elongate member having a first distal 104 end configured for contact with a touch screen and a second distal end 108 opposite the first distal end 104. The stylus 102 has at least one thermal characteristic that is variable, for example when the stylus 102 is in contact with a touch screen, the variable thermal characteristic can be at least one of temperature and/or an amount of heat energy. In one embodiment, the base material is covered with a conductive rubberized coating. The distal end 104 of the stylus 102, or of any elongate member described herein, can include a tip for contact with the touch screen of a mobile device 106. In one example, the tip can be a compliant conductive rubber allowing for compression to create different areas of contact, and thus line width.

As discussed above, it can be beneficial were a stylus to perform more like a physical pen and paper. With thickness, stroke or swath control, a user can better personalize input to the device. For example, as shown in FIG. 1, an example script 112 depicted upon the touch screen has varying thickness, stroke or swath. The image constituted by the script 112 on the touch screen can be processed by a handwriting recognition algorithm present on the mobile device, and/or can become a file or a portion of a file in and of itself. The file can be transferred in any suitable manner, for example, uploaded so that it can be sent to another device. In this way, a personalized message in a personal script can be transmitted. For example, the depicted script 112 says "Thx", which a user can wish to convey in a personal manner.

In one embodiment, when portions of the stylus 102 having different thermal properties are in series, and/or in any other disclosed stylus, a positioning of the grounding or thermal input element, such as a user's grip, can provide control of the thickness stroke or swath. In the present embodiment, the grounding or thermal input element is shown in a position 114. Were the position of the grounding or thermal element to be moved to a position 116, or any other suitable position, the thickness, stroke or swath of a line made by the stylus 102 upon the touch screen can be a different thickness. In one embodiment, the stylus 102 can include a plurality of materials having different thermal properties.

In another embodiment where portions of the stylus 102 have different thermal properties that are in parallel, rotation of the stylus 102 can provide the ability to change the thickness, stroke or swath of a line. For example, rotation 118 of the elongate member with respect to the touch screen is depicted. The rotation 118 can be for the orientation of the stylus 102, and/or for the grip of the user's hand. It is understood that the thermal characteristics of the stylus can be sensitive to various factors including elevation, orientation and/or the user's grip, including location and strength.

In another embodiment, different thermal properties can have a linear profile, for example from the first distal end 104 to the second distal end 108. In another embodiment different thermal properties can have a non-linear profile, for example from the first distal end 104 to the second distal end 108. A combination of linear and non-linear profiles is also contemplated.

As mentioned above, an element such as the stylus 102 can include one or more of at least one thermal characteristic that is variable, at least one mechanical feature to provide at least one thermal characteristic that is variable, and at least one material to provide at least one thermal characteristic that is variable. The variable thermal characteristics can include at least one of temperature and/or heat energy. For example, an elongate member can include a plurality of materials having different thermal properties. The materials can include at least one of a plastic, an elastomer and/or a metal.

It is understood that thermal conductivities of metals can be selected according to composition. The disclosed stylus can be tailored based on to but not limited to the following metals, including alloys of the main constituent, in approximate order of decreasing conductivity: silver, copper, gold, aluminum, beryllium, brasses, bronzes, magnesium, zinc, nickel, steels, and titanium.

It is also understood that various plastics can be made thermally conductive or dissipative through selection of additives. Their physical properties such as hardness or color can be used to advantage in different embodiments of the disclosed stylus. Material can include for example, acrylonitrile butadiene styrene (ABS), polycarbonate (PC), polypropylene (PP), polyamide (PA), polybutylene terephthalate (PBT), polyphthalamide (PPA), polyphenylene sulfide (PPS), polyether ether ketone (PEEK), polyetherimide (PEI), polyamide-imide (PEI), polyoxymethylene (POM) also known as acetal, polymethylmethacrylate (PMMA) also known as acrylic.

Additionally, softer materials, such as elastomers can also be made thermally conductive or dissipative through selection of additives and can be used to advantage in different embodiments of the invention: silicones, silicone rubbers, thermoplastic polyurethane (TPU), thermoplastic elastomers (TPE), thermoplastic polyolefin elastomers (TEO).

It is further understood that conductive additives can be used as well, such as in the housing of the stylus. Such can be varied as to size, shape, and amount, and used to tailor the invention's thermal conductivity: carbon fiber, carbon black, carbon powder, graphite, stainless steel, nickel coated graphite fiber, inherently dissipative polymers (IDP), inherently conductive polymers (ICP), nano-materials including carbon nanotubes (CNT), and/or conductive inks for surface treatment.

Figure 2:
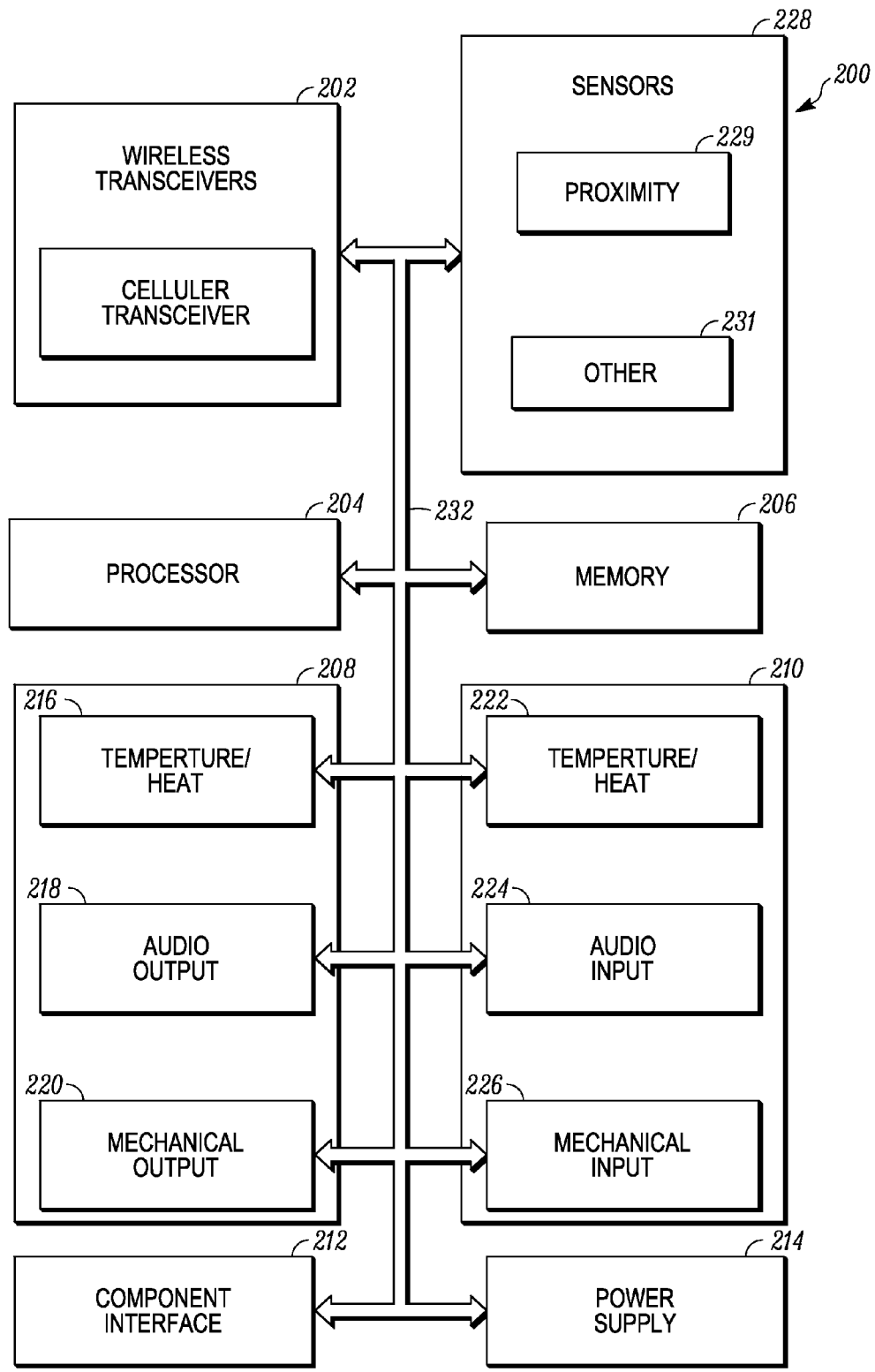
FIG. 2 is a block diagram of an example active stylus that can interact with the touch screen device of FIG. 15.

Turning attention to FIG. 2, depicted is a block diagram 200 of example internal components of active styluses, including the active styluses of FIGS. 1, and 4-14. The internal components of active styluses can include wireless transceivers 202, a processor 204 (e.g., a microprocessor, microcomputer, application-specific integrated circuit, or the like), memory 206, one or more output components 208, one or more input components 210, and one or more sensors 228. The stylus can also include a component interface 212 to provide a direct connection to auxiliary components or accessories for additional or enhanced functionality, and a power supply 214, such as a battery, for providing power to the other internal components. All of the internal components can be coupled to one another, and in communication with one another, by way of one or more internal communication links 232, such as an internal bus.

The memory 206, similar to the memory of the mobile device 1502 (discussed further below), can encompass one or more memory devices of any of a variety of forms (e.g., read-only memory, random access memory, static random access memory, dynamic random access memory, etc.), and can be used by the processor 204 to store and retrieve data. The data that is stored by the memory 206, similarly, can include operating systems, applications, and informational data, where such data is comparable to the data stored by the memory of the mobile device 1502, except for the fact that the data stored is geared towards operation of the active styluses oppose to operation of the mobile device 1502. Given this, one of the active styluses can be programmed such that the processor 204 and memory 206 interact with the other components of the stylus to perform a variety of functions, including interaction with the mobile device 1502, such as the method shown in FIG. 3.

Examples of such interaction are explained in the following paragraphs, and since the styluses are configured to at least interact with the touch screen 1506 of the mobile device 1502 it is fitting to discuss the touch screen 1506 and the mobile device 1502 in detail afterwards.

Figure 3:
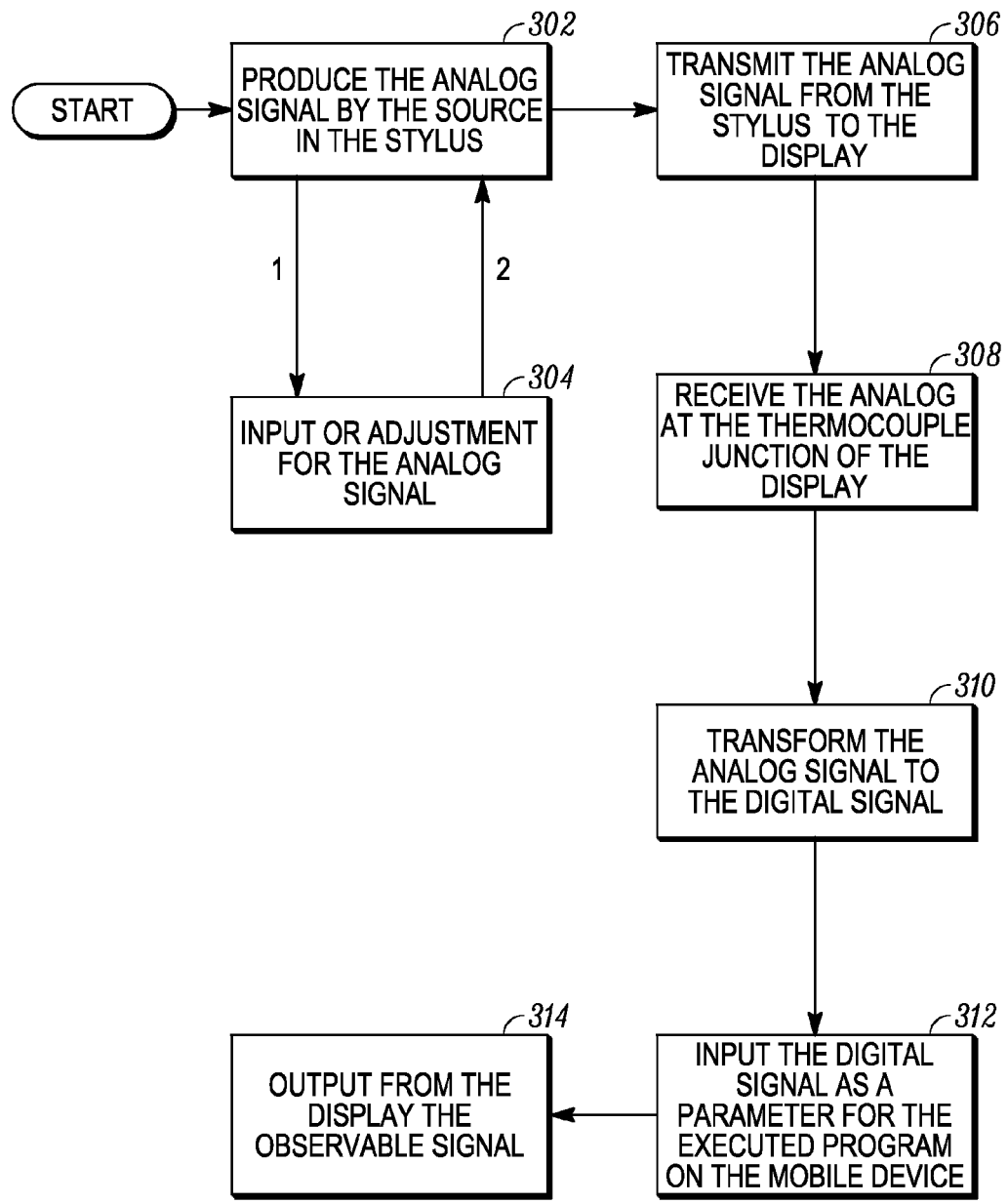
FIG. 3 illustrates an example method for the stylus of FIG. 1, which can interact with the touch screen device of FIG. 15.

FIG. 3 illustrates a method 300 that can be performed by the styluses, such as at a time when application icons, text or other visual content, a canvas, form elements, and/or other graphical user interface components are displayed for interacting with the touch screen 1506. The method begins at a step 302, where a signal source of one of the styluses, such as heat source, produces an analog signal. As noted in one embodiment, the signal source is an analog heat source, such as a thermocouple junction, and the analog signal is a heat and/or temperature signal. Alternatively, the signal that is produced by the signal source can be a digital signal.

At a step 304, while the signal source produces one of the above-mentioned signals of the step 302, the one of the styluses possibly operates to receive modifications to the signal or input that leads to an additional signal of the same type.

At a step 306, the signal is transmitted to the mobile device 1502 from the one of the active styluses. In the present embodiment, the signal is transmitted from a thermocouple junction at an end of the one of the active styluses.

Next, at a step 308, the signal is received at a receiver of the mobile device 1502. Typically, the receiver is at least one receiver of a network of receivers that are on a grid of the touch screen 1506 (or a part thereof). In the present embodiment, the at least one receiver is a thermocouple junction of a thermocouple junction network, which is a part of the touch screen 1506. Additionally, the receiver of the mobile device can be combined with a transmitter of signals of a similar type, so that such transceivers of the mobile device 1502 and the one of the active styluses can be configured for sending and receiving analog and/or digital signals of a similar type.

At a step 310, in the present embodiment, assuming that the signal transmitted from the one of the active styluses at the step 306 is an analog signal, such as an analog heat and/or temperature signal, the analog signal is transformed to a digital signal. In one embodiment, a processor 1604 of the mobile device 1502 transforms the analog signal to the digital signal. Alternatively, in other embodiments where the signal transmitted at the step 306 is already a digital signal, the signal does not have to be transformed; however, modulation of the signal can be required especially where signal quality is of concern. Where modulation is required, the processor 1604 of the mobile device 1502 facilitates such modulation.

At a step 312, the digital signal, whether modulated or not, or transformed from the above-mentioned analog signal, is inputted as a parameter for an executed program running on the mobile device 1502. Upon receiving the input, the program takes one or more actions, one possibly being causing the output of a user observable signal as noted in a step 314. The user observable signal can be presented in various forms, including a heat and/or temperature signal, a visible light signal (e.g., a graphical signal of a graphical user interface displayed on the touch screen 1506), an audio signal, and/or a mechanical or haptic signal such as a vibration, movement, and/or force.

Figure 11:
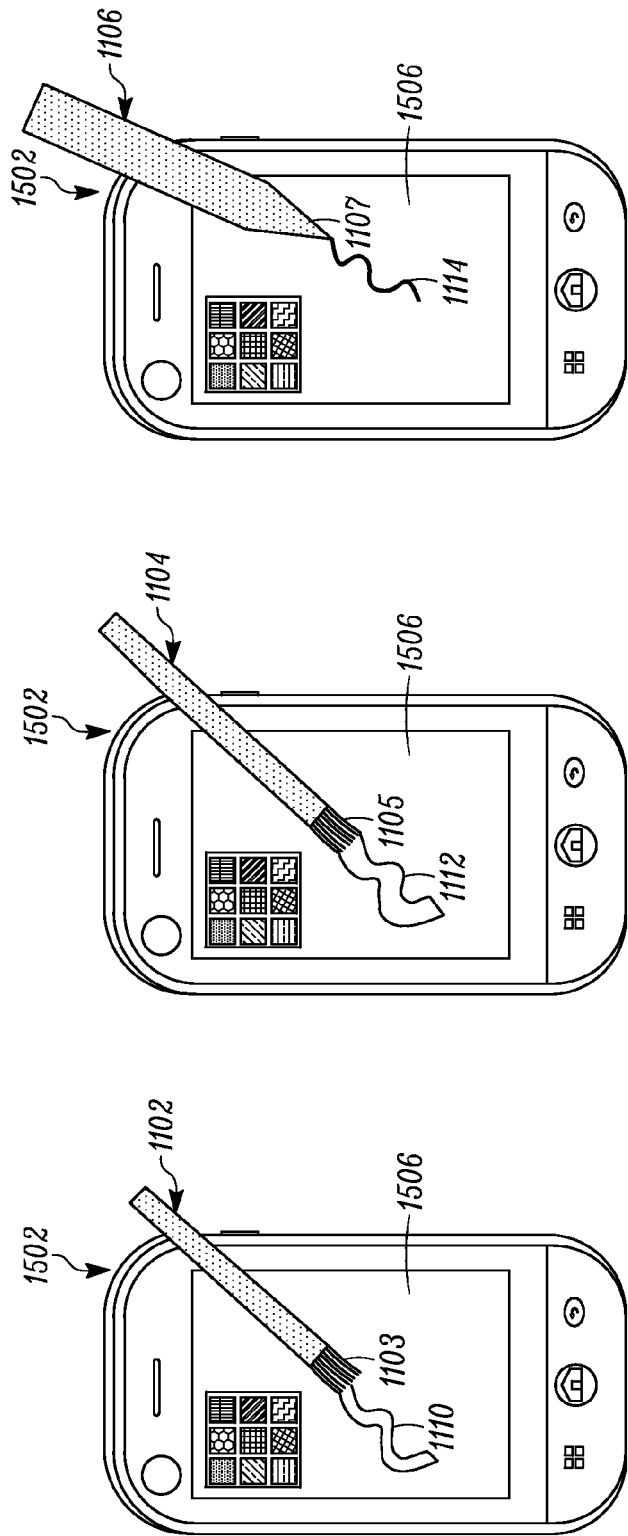
FIG. 11 depicts views of example active styluses interacting with the example touch screen device of FIG. 15.

Referencing FIG. 11, illustrated is an active stylus 1106 with a pointed end 1107 interacting with the mobile device 1502, and two active styluses 1102 and 1104 with brush ends 1103 and 1105, respectively, interacting with the mobile device 1502. In these examples, each of respective ends of the styluses 1102, 1104, or 1106 upon contact with the touch screen 1506 is transmitting a heat and/or temperature signal to one or more thermocouple junctions of a thermocouple junction network, so that the signal transmitted reflects the area of the end contacting the touch screen 1506. In turn, visual output 1110, 1112, or 1114 of the touch screen 1506 reflects the area of the end of the stylus in contact with the screen 1506, respectively. Vice versa, the touch screen 1506 upon contact with the end of one of the active styluses 1102, 1104, or 1106 can transmit a heat and/or temperature signal to one or more thermocouple junctions of the respective ends 1103, 1105, or 1107, so that the signal transmitted reflects the area of the screen 1506 transmitting the signal and contacting the end; and in turn the output of the one of the respective styluses 1102, 1104, or 1106 reflects the area of the screen 1506 transmitting the signal and contacting the respective end 1103, 1105, or 1107 of one of the styluses.

Referring back to FIG. 2, in general, the styluses can be programmed such that the processor 204 and memory 206 interact with the other components of the styluses to perform a variety of functions, including the method illustrated by FIG. 3. Although not specifically shown in FIG. 2, the processor 204 can include various modules for performing the method of FIG. 3. Further, the processor can include various modules for initiating different activities known in the field of active styluses and activities described herein.

Additionally, the wireless transceivers 202 can include transceivers similar to wireless transceivers 1602 of the mobile device 1502, which are described below. Similarly, example operation of the wireless transceivers 202 in conjunction with other internal components of the active stylus can take a variety of forms and can include similar operations that occur in the mobile device 1502, which are also described below.

The output components 208 can include a variety of heat and/or temperature 216, audio 218, and/or mechanical output components 220, including output components similar to those of the mobile device 1502, which are also described below. Additionally, some embodiments of the active stylus can even output visual information. In one noteworthy embodiment, one of the heat and/or temperature output components 216 and/or the mechanical output components 220 can present a code to users with audio and visual impairment so that such users can experience the content presented by the mobile device 1502 via the code, when an end of one of the active styluses is in contact with the portion of the touch screen 1506 displaying the content.

The input components 210 can include a variety of heat and/or temperature 222, audio 224, and/or mechanical input components 226, including input components similar to those of the mobile device 1502. Similar to the output components 208, the input components 210, facilitate interaction with a user as well has interaction with the mobile device 1502. Further, actions that can actuate one or more input/output components 210/208 can include for example, powering on, opening, unlocking, moving, and/or operating one of the styluses.

Additionally, the styluses can include sensors 228 including both proximity sensors 229 and other sensors 231, such as an accelerometer, a gyroscope, or any other sensor that can provide pertinent information, such as to identify a current location or orientation of the stylus 102.

Turning to FIGS. 5, 6, 9, and 10, example output components that transmit various heat and/or temperature signals to a possible thermocouple junction network of the touch screen 1506 when in contact with the touch screen 1506 (or in close enough proximity to the touch screen 1506 to transmit a heat and/or temperature signal) are shown. The styluses 500, 510, 520, and 530 of FIG. 5 each have two heat conducting surfaces, where one of the conducting surfaces of each pair conducts heat differently than the other of the pair, so as to facilitate transmitting and/or receiving at least two different heat and/or temperature signals. For example in the styluses 500, 510, 520, and 530, the respective heat conducting components 502, 512, 522, and 532 conduct more heat, so such can facilitate the styluses performing an interaction with the touch screen 1506, such as writing, selecting, and painting in a first color. By contrast, the respective heat conducting components 504, 514, 524, and 534 conduct less heat, so those components can facilitate the styluses performing an opposing interaction with the touch screen 1506, such as erasing, deselecting, and painting in a second color. In another example, referring particularly to FIG. 6, the active styluses 600, 610, 620, and 630 are configured to receive detachable and replaceable heat conducting attachments 602, 612, 622, and 632, respectively, where each of the different attachments conducts heat differently, so that various heat and/or temperature signals are transmitted and/or received by the stylus depending upon the attachment. Such an embodiment can have various applications, such as being able to draw various colors to the touch screen 1506, where each detachable heat conducting component 602, 612, 622, and 632 causes a different color to be outputted by the display of the mobile device 1502.

Besides varying the effectiveness of conducting heat, the area of the end of the stylus that comes in contact and communicates with the touch screen 1506 of the mobile device 1502 can also be varied. For example, the end of a stylus can be pointed (e.g., an end 902 of stylus 900), blunt (e.g., an end 904 of stylus 900), multiple pointed (e.g., an end 912 of stylus 910), round (e.g., an end 506 of stylus 500), flat but narrow (e.g., both ends 516 and 518 of stylus 510), and brush-like having filaments (e.g., respective ends 1002 and 1012 of respective styluses 1000 and 1010). The brush-like ends 1002 and 1012 can vary greatly in that the filaments can vary in thickness, and each filament can vary vertically in heat conductivity. By varying the heat conductivity vertically along each filament, the heat and/or temperature signal varies vertically; and therefore, using such an end with a paint application the end can simulate effects of a real paintbrush, such as greater color density at the tip of the brush. Varying the thickness of each filament and the amount of filaments on a brush-like end can also facilitate simulating the effect of a real paintbrush. Further, the duration of time the filaments are in contact with the touch screen 1506 can alter the signal received by the stylus and then transmitted back to the device 1502, and vice versa. For example, intensity of a color selected from a displayed color palate can increase as the filaments stay in contact with the palate, which is analogous to fibers of a brush absorbing more paint as the brush sits in the paint for a longer duration of time. Additionally, the force that the filaments apply to the touch screen 1506 can also affect the signal received by the stylus and then transmitted back to the device 1502, and vice versa. Likewise, a more forceful brush stroke could increase the color intensity of a line added to a virtual canvas.

With reference to FIGS. 4, 7, 8, and 12-14, illustrated are active styluses that interact with the mobile device 1502 that include one or more signal adjustment mechanisms.

Figure 4:
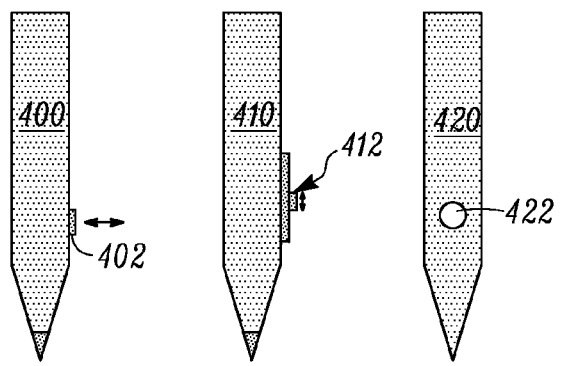
FIGS. 4-10 and 12-14 are side perspective views of example active styluses that can interact with the example touch screen device of FIG. 15.

Specifically, FIG. 4 depicts active styluses 400, 410, and 420 each having a respective signal adjustment mechanism 402, 412, and 422 (e.g., a heat and/or temperature signal adjustment mechanism) for modifying at least one signal (e.g., for increasing and decreasing the amount of heat or the temperature for at least one heat or temperature signal), where the respective signal adjustment mechanism can include a push button 402, a slide mechanism 412, and a turnable or rotatable knob 422 having at least two states for varying the at least one signal so that the variation is distinguishable to at least one receiver (e.g., a thermocouple junction) of the mobile device 1502. In the embodiment where there is a push button 402, typically the push button 402 has only two states that vary the signal, whereas in embodiments having the slide mechanism 412 or the turnable knob 422, there are usually more than two states that vary the signal. Furthermore, in embodiments having the slide mechanism 412 or the turnable knob 422, the signals that are caused by changing the state of the signal adjustment mechanism can vary continuously. For example, where the form of the signal is a heat and/or temperature signal, the temperature or the amount of heat can vary continuously; therefore, the signal is modified continuously with practically infinite variations. However, in such cases, the number of variations detectable depends on the quality of the at least one receiver (e.g., the thermocouple junction) of the mobile device 1502 and the propagating transmitter (e.g., a thermocouple junction) of the stylus.

Figure 8:
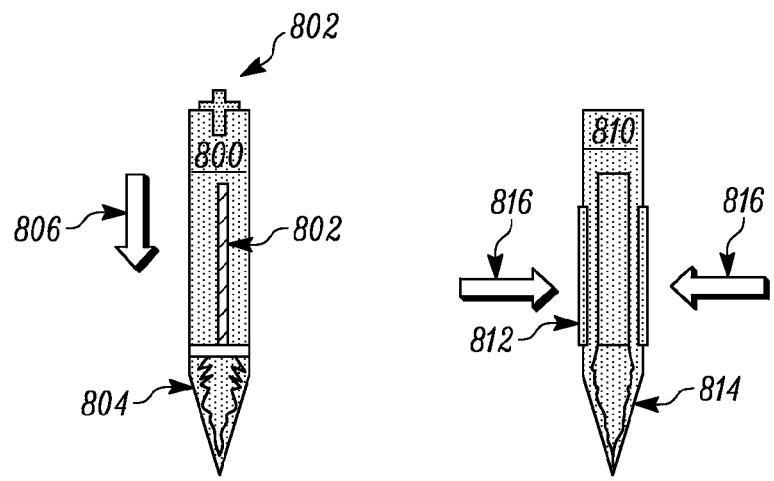
Figure 9:
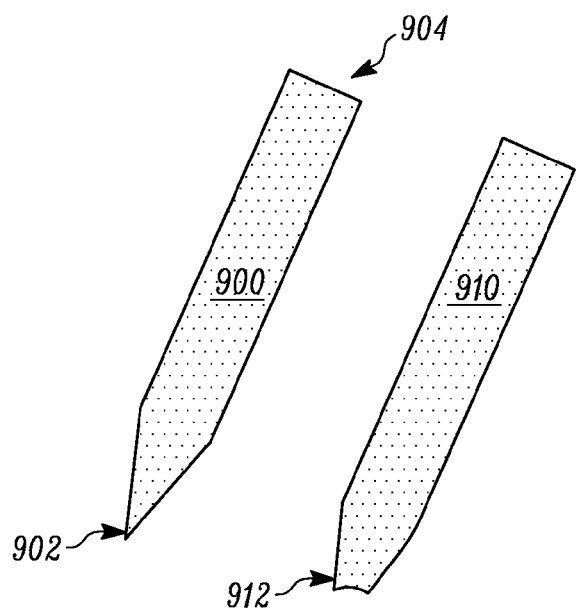
Figure 10:
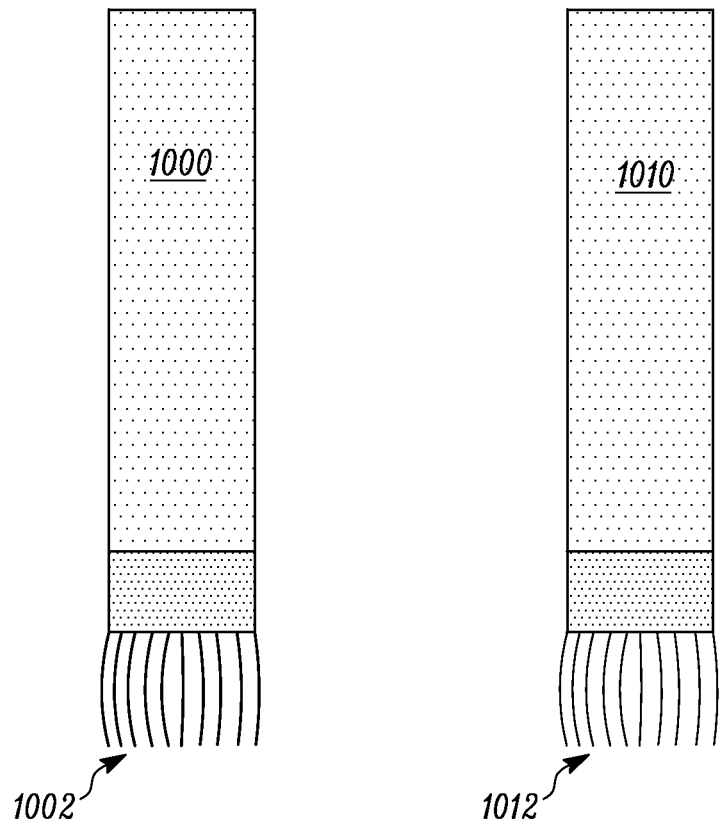

With reference to FIGS. 8 and 14, depicted specifically are push button and pressure sensitive adjustment mechanisms 802, 812, 1406, and 1404, where pressure is applied to the signal adjustment mechanisms 802, 812, 1406, and 1404, respectfully, usually by a user's finger. In the case of the stylus on the left 800, downward pressure 806 to the signal adjustment mechanism 802 causes a conductive material (e.g., metal) 804 to compress vertically and therefore become more resistive and produce a greater amount of heat or a higher temperature. The same is the case for the stylus on the right 810, except horizontal inward pressure 816 towards the signal adjustment mechanism 812 causes the conductive material 814 to compress horizontally and in turn produce a greater amount of heat or a higher temperature. In the case of the stylus of FIG. 14, the stylus 1400 has multiple push button signal adjustment mechanisms (e.g., mechanisms 1404 and 1406), where pressing each button varies the amount of heat or the temperature propagated from the end 1402 of the stylus 1400. Alternatively, fixed resistivity materials can be used to facilitate the aforementioned functionalities. In this alternative, materials with fixed resistivity can be used to couple body heat to the stylus differently at different locations of the stylus (e.g., a green colored area of the stylus conducts more heat than a blue area due to the material of the green area having greater heat conducting properties, or different areas of the stylus having different physical features such as bumps or ridges oppose to a smooth surface).

Alternatively, force-sensing resistors can be used to facilitate the aforementioned functionalities as shown in FIG. 8.

Figure 13:
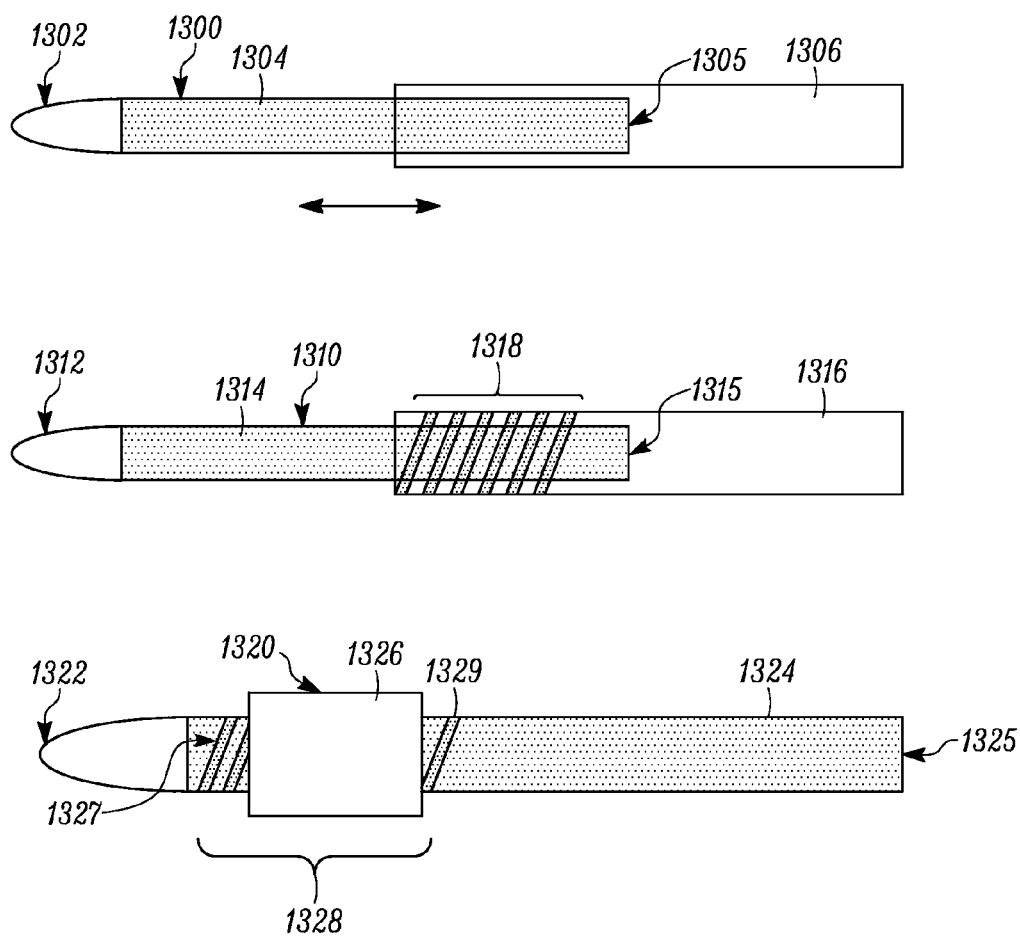

With reference to FIG. 13, depicted specifically are example embodiments of styluses 1300, 1310, 1320 having respective slide and turnable knob type signal adjustment mechanisms, where generally these mechanisms include a part 1306, 1316, and 1326 that encloses part of the shaft 1304, 1314, and 1324, respectively. Specifically, the stylus 1300 has a housing part 1306 that surrounds the shaft 1304. The housing part 1306 in this case is at least part of the signal adjustment mechanism, where a user can push or pull the housing part 1306 along the shaft 1304 to modify the signal propagated from the end 1302. The stylus 1310 has a housing part 1316 with threads 1318 that mate with threads (not depicted) on the outer surface of the shaft 1314. Similarly, this housing part 1316 encircles the shaft 1314 and is at least part of the signal adjustment mechanism. In this case, the user can turn the housing part 1316 so that the housing moves along the shaft 1314 modifying the signal propagated from the end 1312. Similar to the stylus 1310, the stylus 1320 has a part 1326 of the signal adjustment mechanism that the user can turn to modify the signal propagated from the end 1322 of the stylus 1320. Unlike the styluses 1300 and 1310, the movement of the part 1318 along the shaft 1324 towards the end 1322 is not stopped by the other end 1325 of the stylus 1320. Whereas the other ends 1305 and 1315 can act as stops on the styluses 1300 and 1310, respectively. On the stylus 1300 the ends 1327 and 1329 of a thread 1328 on the outer surface of the shaft 1324 are the stops. Likewise, the thread 1328 mates with a thread (not depicted) of the adjustment part 1326 to facilitate the turning of the part 1326. Regarding the signal propagated from the ends 1302, 1312, 1322, respectively, of these styluses 1300, 1310, and 1320, respectively, similar to the other active styluses mentioned herein, the signal adjusted can be a heat and/or temperature signal.

Figure 7:
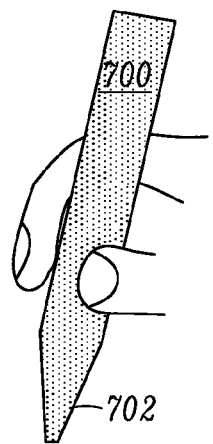
Figure 12:
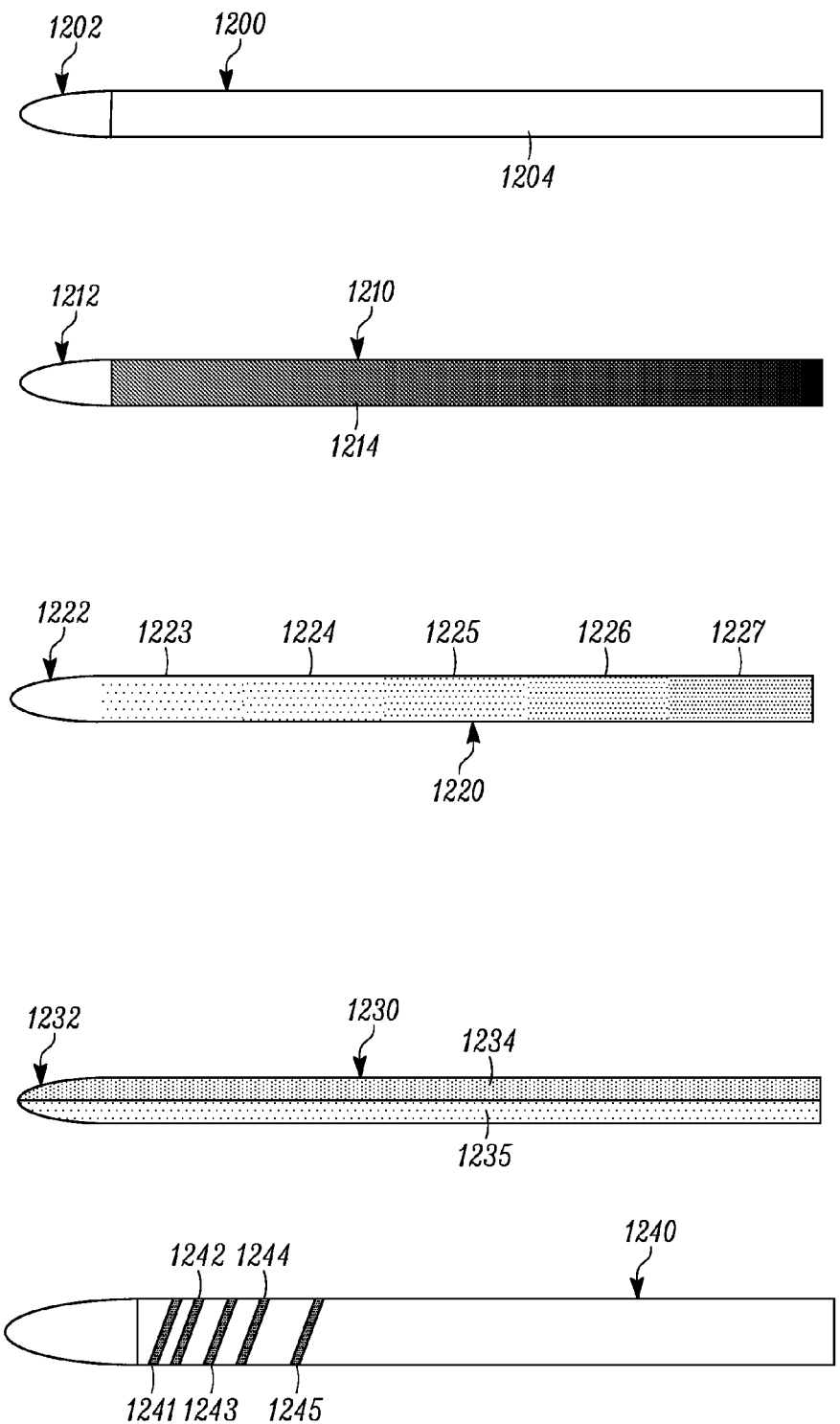

With reference to FIGS. 7 and 12, depicted specifically are signal adjustment mechanisms 702, 1204, 1214, 1223-1227, 1234, and 1235, respectively, where each include heat conducting material that covers the outside of the shaft or include at least one sensor on or beneath the outer surface of the shaft, where either form of implementation communicates to the internal components of each stylus body heat or temperature emitted from a user's finger or hand. Some implementations of such signal adjustment mechanisms include thermocouple junctions that transform the heat and/or temperature signal from the user's finger to an electric signal, which is then communicated via circuitry of the active stylus, which in turn communicates the electric signal to a thermocouple junction at the end of the stylus. This end thermocouple junction then transforms the electric signal into a heat and/or temperature signal that can be propagated to the mobile device 1502, which receives the signal at its own thermocouple junction that is typically part of a thermocouple junction network. In one alternative of this embodiment, when the user touches the stylus at the signal adjustment mechanism or heat/temperature input component, the processor of the stylus sets a delta variable, which represents the difference in temperature between the tip and the user's finger at point of contact with the input component. In turn, the user touches the stylus to the touch screen 1506, and the delta variable is transmitted to and recorded by the device 1502. Subsequently, when the user's finger temperature changes or the user is wearing a glove a new delta value is transmitted to and recorded by the device 1502, which allows the processor of the device 1502 to make several deductions about the user and the environment of the user, such as the user is outside and wearing a glove or the user has a fever. In some other implementations, where possible, the signal adjustment mechanism merely conducts the heat from the user's finger to the end of the stylus.

With particular reference to the styluses of FIG. 12, the figure depicts alternative layouts of such signal adjustment mechanisms. In the case of the stylus 1200, there is one signal adjustment mechanism 1204 that merely communicates to the stylus 1200 that it is being touched or held by a user. In the cases of the styluses 1210, 1220, 1230, and 1240 there are more than one region along the shaft of each stylus, where each region facilitates different input into the stylus as if each region is a separate signal adjustment mechanism. Specifically, the stylus 1210 has continuous changing regions 1214 along the shaft that facilitate a user inputting continuously different inputs (which can be particularly useful in drawing applications and applications that simulate a musical instrument such as a trombone). Further, the stylus 1210 can vary continuously in a linear or non-linear fashion. The styluses 1220, 1230, and 1240 have respective multiple but discrete regions 1223-1227 and 1241-1245 (in series) and 1234-1235 (in parallel) that facilitate discrete inputs by the user, where these styluses 1220, 1230, and 1240 can also vary linearly or non-linearly, respectively. Further, where there is a greater amount of discrete regions, such as in the stylus 1220, such regions can be useful for drawing and musical applications where discrete shades or tones are preferred.

Although not depicted, the mobile device 1502 can also include similar signal adjustment mechanisms as the styluses described above and as the styluses depicted in FIGS. 1-14. In other words, the mobile device 1502 can also include signal adjustment mechanisms that can adjust a heat and/or temperature signal.

Whether the signal is eventually communicated to the mobile device 1502 from one of the styluses, or vice versa, it should be appreciated that a variety of applications can take advantage of modifying continuously or discretely signals generated by the styluses. The following are a number of example applications that take advantage of a continuum of varying signals or a discrete set of varying signals. Zoom, focus, content rewrapping, brightness, contrast, hue, tint, volume control, audio levels, and any other manner of altering the audio/visual user interface displayed or presented by the device 1502 would benefit from being able to be altered continuously. Additionally being able to alter any particular element displayed to the user would also benefit from continuous adjustment, such as altering colors or tones. Contrary, altering such things, such as text language, font format, or font size can benefit from being able to adjust the signal discretely (font size can also benefit from continuous adjustments). Discrete control of the signal is also useful for performing actions on content or executable icons of a graphic user interface of the device 1502, such as selecting, cutting, copying, and pasting content, or executing an application associated with the icon and right-clicking the icon (e.g., opening a menu related to the icon or performing another action besides executing the application associated with the icon). Discrete control is also useful for shifting, number locking, and capital letter locking.

As mentioned previously, since the styluses are configured to at least interact with at least the mobile device 1502 it is fitting to discuss the mobile device 1502 in greater detail and similar mobile devices that can interact with the styluses.

Figure 17:
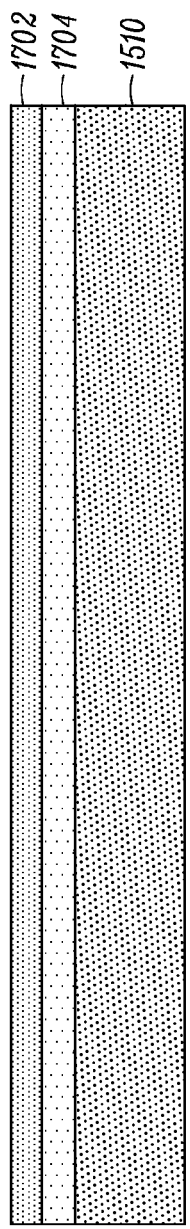
FIGS. 17-20 are cross-sectional views illustrating components of the example touch screen device of FIG. 15.
Figure 18:
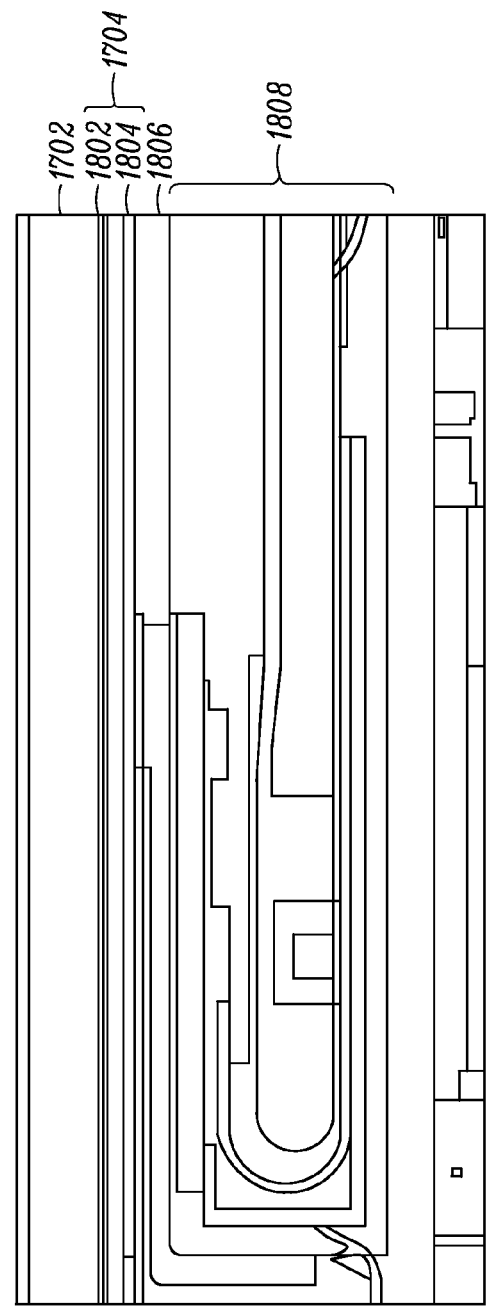

Referring to FIG. 15, a front perspective view of an example embodiment of the mobile device 1502 is illustrated, which can take the form of a mobile phone, personal digital assistant, remote controller, electronic book reader, tablet, or portable video game console and can include functions such as calling, emailing, texting, image acquisition, internet browsing functions, gaming, as well as others. The mobile device 1502 includes a movement sensing assembly, which in FIG. 15 takes the form of a touch detecting surface 1504 associated with a display screen 1508 to form the touch screen 1506, where the touch screen is housed with other components in a housing structure 1510. The touch detecting surface 1504 can be any of a variety of known touch detecting technologies such as a resistive technology, a capacitive technology, or an optical technology. Further, the touch detecting surface 1504 can include or be replaced by a thermocouple junction or a thermocouple junction network as shown in FIGS. 17 and 18, respectively. As illustrated, the touch detecting surface 1504 includes a light permeable panel or other technology which overlaps the display screen 1508 (such as a liquid crystal display screen). Alternately, the movement sensing assembly could be a touchpad (not overlapping the display screen), a joystick, a mouse, or other types of user interfaces.

Referring to FIGS. 17-20, cross-sectional views of components of the example mobile electronic device 1502 show how example movement sensing assemblies can be situated with other components of the example mobile electronic device 1502. FIGS. 17 and 18 illustrate a display lens 1702 lying over a thermocouple junction network 1704 that is above a display screen 1808. As shown in FIG. 18, in one embodiment, the thermocouple junction network 404 is made up of a substantially transparent conductor layer containing dissimilar conductor types to form thermocouple junctions, such as a combination of an indium tin oxide (ITO) layer and a doped ITO layer with other materials 502 on a polyester film (e.g., PET film) 504. The thermocouple junctions can be derived using dissimilar metals (or other types of materials) joined at a point where heat is generated at that point following the application of a voltage at terminals of the dissimilar metals. The reverse is true as well, where a voltage is generated at the terminals in relation to a junction's temperature. In an alternative embodiment, any type of insulator layer, such as glass, can replace the PET film. Similar to capacitive or resistive type movement sensing assemblies the thermal type assemblies measure touches by a grid. However, beyond mere contact or closing of a circuit, the thermal type assemblies can add an additional parameter to their communications, which is a specific amount of heat, a specific temperature, or a combination of the two (hereinafter one of these alternative signals is referred to as a heat and/or temperature signal). It should be noted that using such a grid is preferred, considering the size of a touch screen on a small mobile device, such as a smart phone.

FIG. 18 further illustrates an air gap 1806 that can be found between a movement sensing assembly, such as the thermocouple junction network 1704, and the display screen 1808. An advantage of the thermocouple junction network 1704 over other forms of movement sensing assemblies is that the heat from the thermocouple junction network 1704 can be used to evaporate moisture that can get trapped in the air gap 1806. Another advantage is that the network 1704 can burn off oils or grime that can distort the electric field of capacitive type touch detection assemblies.

Figure 19:
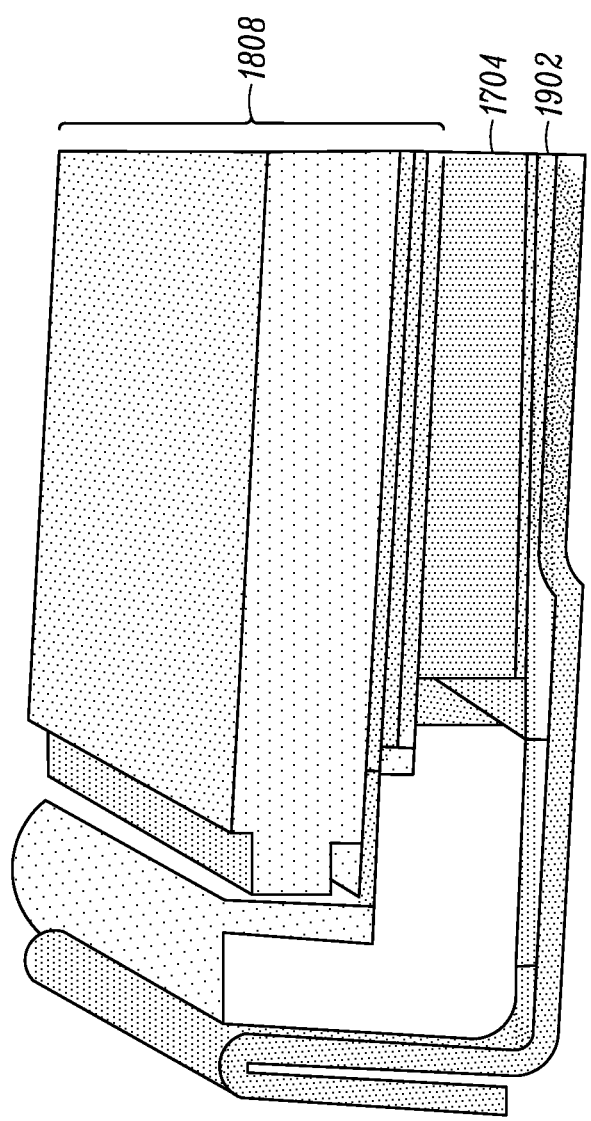
Figure 20:
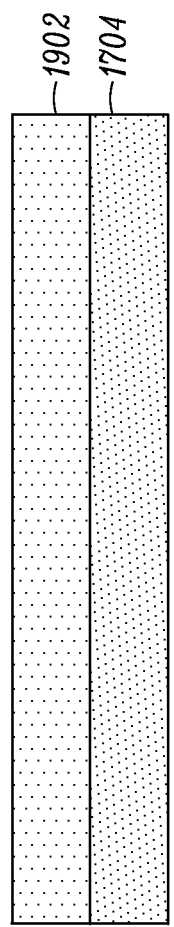

FIGS. 19 and 20, further illustrate an alternative embodiment where thermochromic film 1902 is laminated to the ITO layer 1802 of the thermocouple junction network 1704. Another advantage of using the thermocouple junction network 1704 is that it can be combined with the thermochromic film 1902, so that the film 1902 can be modified by the thermocouple junction network 1704 to improve the display visibility under different lighting conditions.

Figure 16:
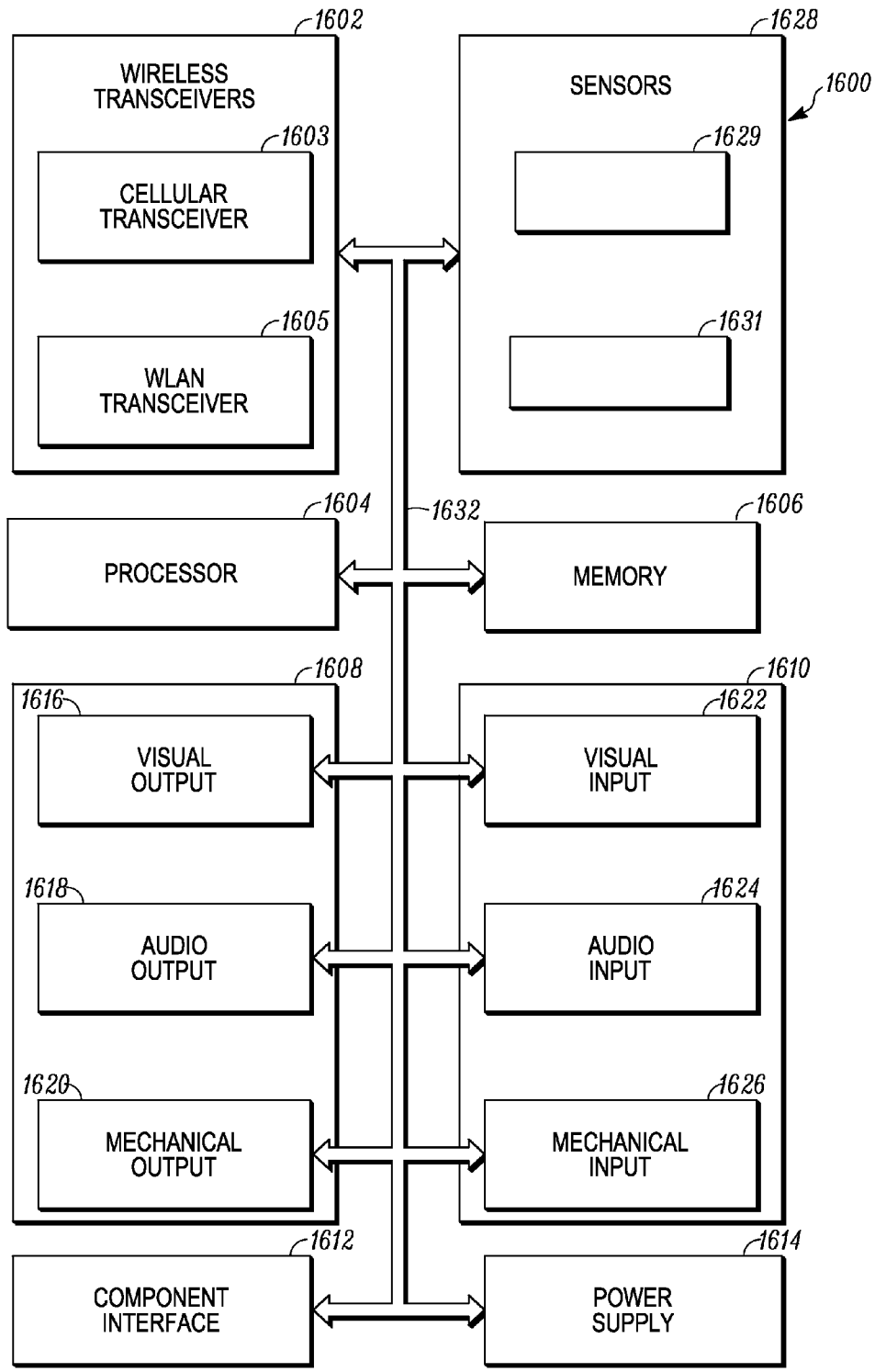
FIG. 16 is a block diagram of the example touch screen device of FIG. 15.

Referring to FIG. 16, a block diagram 1600 illustrates example internal components of a mobile smart phone implementation of the mobile device 1502. These components can include wireless transceivers 1602, a processor 1604 (e.g., a microprocessor, microcomputer, application-specific integrated circuit, or the like), memory 1606 (which in at least some embodiments, the processor 204 and the memory 206 are on one integrated circuit), one or more output components 1608, one or more input components 1610, and one or more sensors 1628. The device can also include a component interface 1612 to provide a direct connection to auxiliary components or accessories for additional or enhanced functionality, and a power supply 1614, such as a battery, for providing power to the other internal components. All of the internal components can be coupled to one another, and in communication with one another, by way of one or more internal communication links 1632, such as an internal bus.

The memory 1606 can encompass one or more memory devices of any of a variety of forms (e.g., read-only memory, random access memory, static random access memory, dynamic random access memory, etc.), and can be used by the processor 1604 to store and retrieve data. The data that is stored by the memory 1606 can include operating systems, applications, and informational data. Each operating system includes executable code that controls basic functions of the electronic device, such as interaction among the various internal components, communication with external devices via the wireless transceivers 1602 and/or the component interface 1612, and storage and retrieval of applications and data to and from the memory 1606. Each application includes executable code that utilizes an operating system to provide more specific functionality for the communication devices, such as the facilitating communication between the mobile device 1502 and an active stylus as illustrated in FIG. 3.

As for programs (applications), each program includes executable code that utilizes an operating system to provide more specific functionality, such as the facilitating communication between the mobile device 1502 and an active stylus as illustrated in FIG. 3. Although many such programs govern standard or required functionality of the mobile device 1502, in many cases the programs include applications governing optional or specialized functionality, which can be provided in some cases by third party vendors unrelated to the mobile device manufacturer.

Finally, with respect to informational data, this is non-executable code or information that can be referenced and/or manipulated by an operating system or program for performing functions of the mobile device 1502. Such informational data can include, for example, data that is preprogrammed upon the mobile device 1502 during manufacture, or any of a variety of types of information that is uploaded to, downloaded from, or otherwise accessed at servers or other devices with which the mobile device 1502 is in communication during its ongoing operation.

Additionally, the mobile device 1502 can be programmed such that the processor 1604 and memory 1606 interact with the other components of the mobile device to perform a variety of functions, including the method illustrated by FIG. 3. Although not specifically shown in FIG. 16, the processor can include various modules for performing the method of FIG. 3. Further, the processor can include various modules for initiating different activities known in the field of mobile devices and described herein.

The wireless transceivers 1602 can include both cellular transceivers 1603 and a wireless local area network (WLAN) transceiver 1605. Each of the wireless transceivers 1602 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

Example operation of the wireless transceivers 1602 in conjunction with the other internal components of the electronic device 1502 can take a variety of forms and can include, for example, operation in which, upon reception of wireless signals, the internal components detect communication signals and the transceiver 1602 demodulates the communication signals to recover incoming information, such as voice and/or data, transmitted by the wireless signals. After receiving the incoming information from the transceiver 1602, the processor 1604 formats the incoming information for the one or more output components 1608. Likewise, for transmission of wireless signals, the processor 1604 formats outgoing information, which can or can not be activated by the input components 1610, and conveys the outgoing information to one or more of the wireless transceivers 1602 for modulation as communication signals. The wireless transceiver(s) 1602 convey the modulated signals to a remote device, such as a cell tower or an access point (not shown).

The output components 1608 can include a variety of visual, audio, mechanical, and/or thermal outputs (such as heat and/or temperature output signals). For example, the output components 1608 can include one or more visual output components 1616 such as the display screen 1808. One or more audio output components 1618 can include a speaker, alarm, and/or buzzer, and one or more mechanical output components 1620 can include a vibrating mechanism for example. Furthermore, the display screen 1808 can emit thermal signals whether heat and/or temperature signals. Similarly, the input components 1610 can include one or more visual input components 1622 such as an optical sensor of a camera, one or more audio input components 1624 such as a microphone, and one or more mechanical input components 1626 such as the touch detecting surface 1504 and the push button 1512 of FIG. 15. Additionally, the display screen 1808 and other components can include a thermocouple junction or a thermocouple junction network for inputting the thermal signals (also referred to as heat and/or temperature signals).

Actions that can actuate one or more input/output components 1610/1608 can include for example, powering on, opening, unlocking, moving, touching with an end of an active stylus, and/or operating the device 1502. For example, upon power on, a 'home screen' with a predetermined set of application icons can be displayed on the display screen 1808.

The sensors 1628 can include both proximity sensors 1629 and other sensors 1631, such as an accelerometer, a gyroscope, or any other sensor that can provide pertinent information, such as to identify a current location or orientation of the device 102.

Referring back to FIG. 15, the mobile device 1502 is operable to detect and identify various gestures by a user (where each gesture is a specified pattern of movement of an external object, such as movement from one or more fingers or movement from an end of a stylus or active stylus, relative to the device). The touch screen 1506 is advantageous because changeable graphics can be displayed directly underlying the touch detecting surface on which controlling hand gestures are applied. Furthermore, the touch screen 1506, as mentioned above, can include a thermocouple junction network or another form of a temperature or heat source that can provide for an even more dynamic interaction between the touch screen 1506 and a user by propagating heat and/or temperature signals and in some embodiments receiving such signals. Additionally, other elements of the user interface of the mobile device can be able to detect the gestures by the user, and at least one of such elements possibly has a thermocouple junction beneath it as well.

As noted previously there are several useful applications in the subject matter of this disclosure. For example, generally taught herein are more robust manners for interacting with a mobile device. Further, the described dynamic interactions between the mobile device 1502 and the active styluses facilitate more enriching applications than contemporary solutions. For example, the above-mentioned methods and the styluses device can provide for interaction between an active stylus and the touch screen 1506 so that for example visually impaired can perceive the information displayed by the screen 1506. Additionally the styluses and the methods can facilitate a thermally sensitive brush/stylus to interact with the screen 1506 to simulate a more realistic painting or drawing experience, such as simulating the mixing of colors on a simulated color palette. Furthermore, colors or information in general can be transferred via the active stylus to other mobiles devices having similar technologies to the device 1502. Another possible benefit of the styluses is handwriting recognition, where the thermal interaction between one of the styluses and the mobile device 1502 provides for more information concerning handwriting recognition than if merely a passive stylus was used.

The methods and styluses also allow for more refined touch interaction than touching with a user's finger. A fine touch can be useful especially when making edits to a displayed photograph. For example, fine-tuning coloring of a subject, cropping, or removing red eye can be enhance by an active stylus. Additionally, the fine touch of a stylus and the options provided by an active stylus allow for various applications to have more options in a displayed area and also allow such options to have multiple dimensions. Further, using an active stylus can be more ergonomic than using a finger to interact with a touch screen, especially when taking handwritten notes.

As noted previously and as understood by those in the art, the processors 204 and 1604 execute computer program code to implement the methods described herein. Embodiments include computer program code containing instructions embodied in tangible media, such as a miniature- or micro-flash memory card or any other processor readable storage medium of appropriate size, where, when the computer program code is loaded into and executed by a processor, the processor becomes an apparatus for practicing the invention. Embodiments include computer program code, for example, whether stored in a storage medium, loaded into and/or executed by a processor, or transmitted over some transmission medium, such as over electromagnetic wiring or cabling, through fiber optics, or via thermal radiation, where, when the computer program code is loaded into and executed by a processor, the processor becomes an apparatus for practicing the invention. Further, the computer program code segments configure the microprocessor to create specific logic circuits.

It is specifically intended that the present invention not be limited to the embodiments and illustrations contained herein, but include modified forms of those embodiments, including portions of the embodiments and combinations of elements of different embodiments as come within the scope of the following claims.

Example Embodiments of the Mobile Device

As mentioned previously, since the aforementioned mobile devices and the active styluses are configured to at least interact with each other it is fitting to discuss other example embodiments of the mobile devices. Disclosed in this section are more examples of mobile devices that can interact with the active styluses. Further, it should be understood that although some of the terms in this section are different from some of the terms in the preceding sections, some of the terms in this section have similar meaning to some of the terms in the preceding sections.

Figure 21:
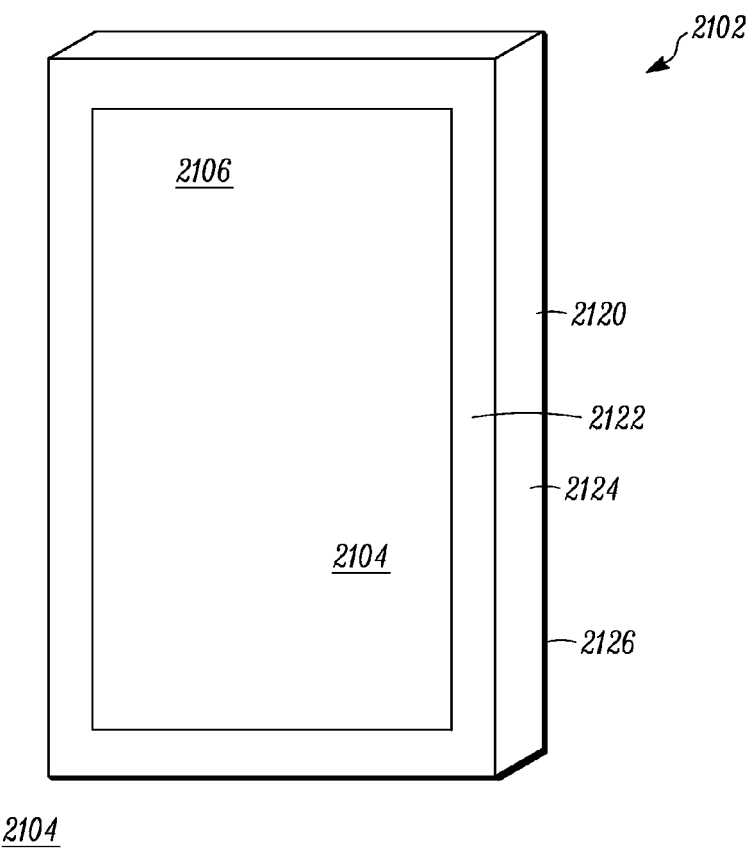
FIG. 21 is a front perspective view of an example user computer device in accordance with an embodiment of the present invention.

Referring to FIG. 21, illustrated is a block diagram of an exemplary user computer device 2102 in accordance with an embodiment of the present invention. User computer device 2102 may be any user computer device that allows a user to input instructions to the device via a touch screen 2104 and, optionally, may be capable of sending and receiving communication signals on a wireless network. Preferably, user computer device 2102 is a wireless mobile device, such as a cellular telephone, a radio telephone, a smart phone, or a personal digital assistant (PDA), a laptop computer or a tablet computer with radio frequency (RF) capabilities, or any other handheld or portable electronic device with a user interface comprising a touch screen 2104 that allows a user to input instructions into the user computer device; however, user computer device 2102 may be any type of user computer device, such as a personal computer or a laptop or tablet computer without wireless capabilities, that has a user interface that includes a temperature sensitive touch screen. User computer device further comprises a housing 2120 with a front side 2122 that includes touch screen 2104, side edges 2124, and a back side 2126.

Figure 22:
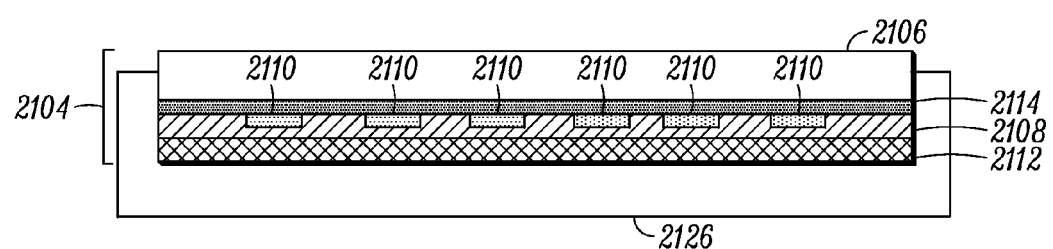
FIG. 22 is a cross-sectional side view of the example user computer device of FIG. 21.

Referring now to FIGS. 21 and 22, touch screen 2104 is a 'temperature sensitive' touch screen that includes a touch screen panel 2106, typically an insulator such as glass, and a temperature sensitive user interface 2108. Temperature sensitive user interface 2108 includes temperature sensing componentry that allows for detection of a temperature differential existing between different locations on touch screen 2104. The temperature sensing componentry more particularly includes multiple temperature sensing devices 2110 positioned proximate to, or embedded in, panel 2106 of touch screen 2104. As will be described further below, temperature signals are provided from the temperature sensing devices 2110 that are indicative of the temperatures at those respective temperature sensing devices. The multiple temperature sensing devices 2110 also are capable of generating thermal energy that may be sensed by user of the device.

By virtue of processing performed by user computer device 2102 utilizing the information communicated by way of temperature signals, the user computer device is able to sense a temperature differential existing between the temperatures sensed by different sensing devices (or different groups of sensing devices) which is indicative of a temperature differential existing between the locations of those different sensing devices (or groups of sensing devices). This temperature differential information then may used in combination with other information obtained via other types of sensors by user computer device 2102 to determine/predict an operational condition or context of the user computer device.

Figure 5:
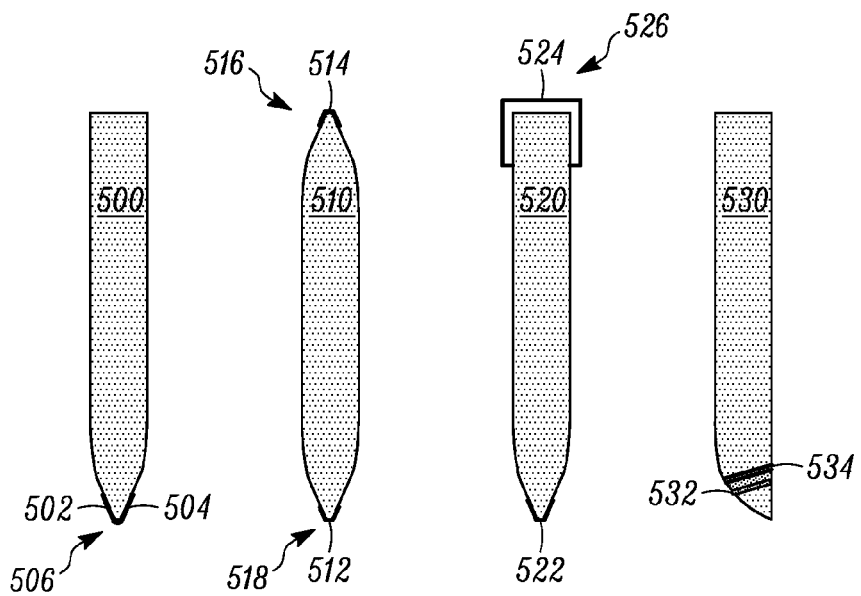
Figure 6:
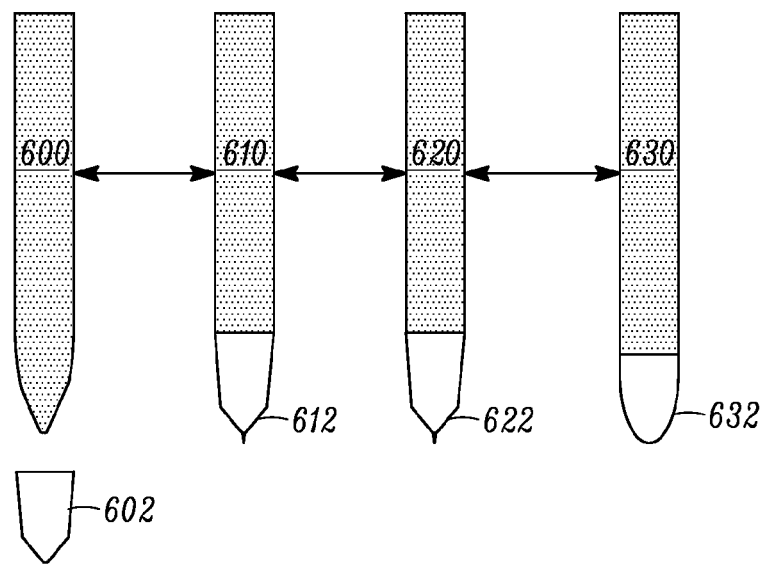
Figure 23:
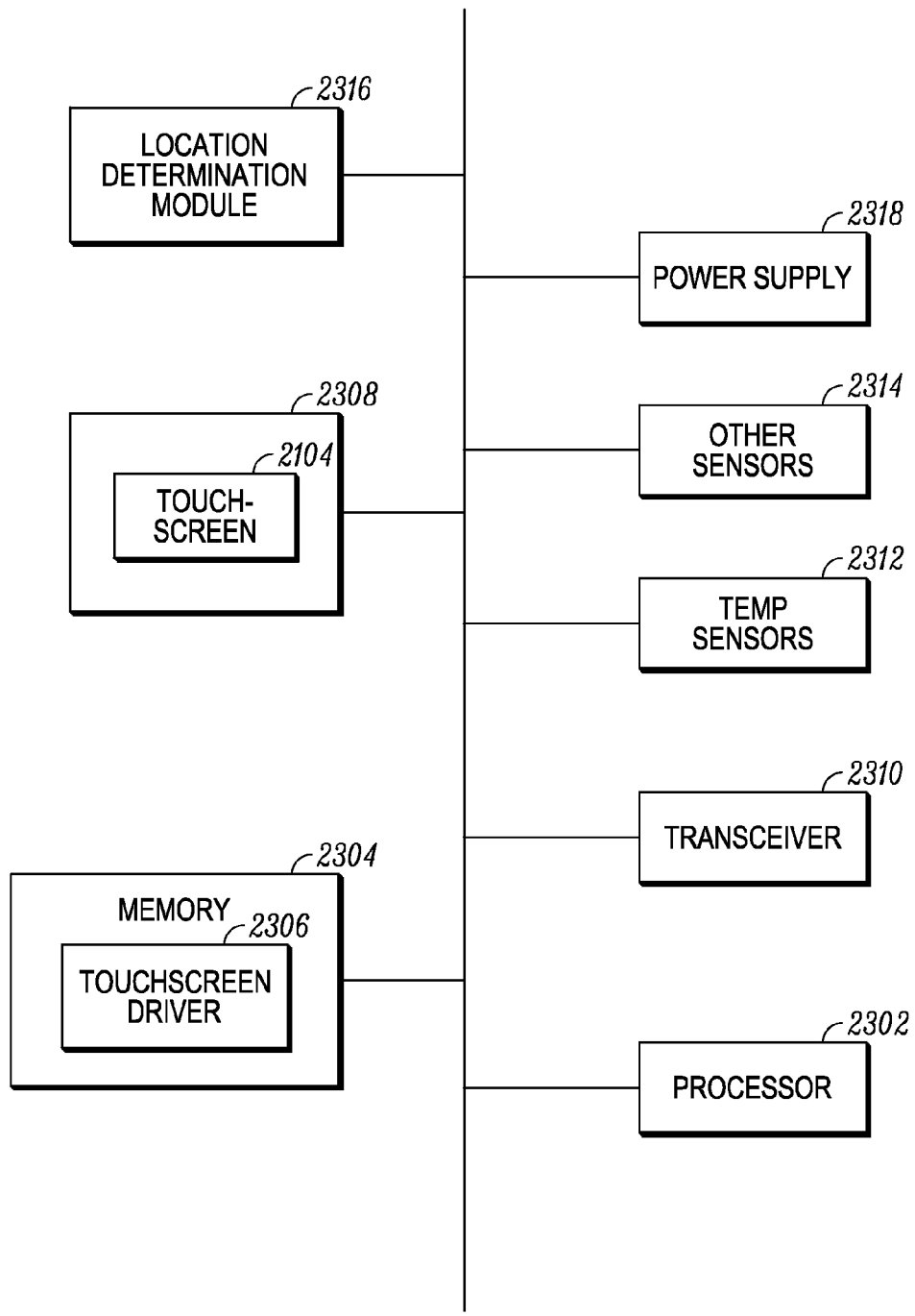
FIG. 23 is a block diagram of the example user computer device of FIG. 21.

Referring now to FIGS. 23-5, block diagrams are depicted of user computer device 2102 in accordance with various embodiments of the present invention. Referring first to FIG. 23, user computer device 2102 includes a processor 2302 such as one or more microprocessors, microcontrollers, digital signal processors (DSPs), combinations thereof or such other devices known to those having ordinary skill in the art. The particular operations/functions of processor 2302, and respectively thus of user computer device 2300, are determined by an execution of software instructions and routines that are stored in a respective at least one memory device 2304 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of processor 2302 alternatively may be implemented in hardware, for example, integrated circuits (ICs), application specific integrated circuits (ASICs), a programmable logic device such as a PLD, PLA, FPGA or PAL, and the like, implemented in the user computer device. Based on the present disclosure, one skilled in the art will be readily capable of producing and implementing such software and/or hardware without undo experimentation. Unless otherwise indicated, the functions described herein as being performed by user computer device 2102 are performed by processor 2302.

User computer device 2102 further includes a user interface 2308 and, optionally, a transceiver 2310 and a location determination module 2316, that are each coupled to processor 2302. Transceiver 2310 includes at least one wireless receiver (not shown) and at least one wireless transmitter (not shown) for receiving and transmitting wireless signals, such a radio frequency (RF) signals and/or short-range signals such as Bluetooth signals. Location determination module 2316, such as a GPS (Global Positioning Satellite) module comprising a GPS receiver, determines a geographical location of the user computer device. User interface 2308 includes a display screen that comprises 'thermally sensitive' touch screen 2104, and further may include a keypad, buttons, a touch pad, a joystick, an additional display, or any other device useful for providing an interface between a user and an electronic device such as user computer device 2102. The display screen may be a liquid crystal display (LCD), a light emitting diode (LED) display, a plasma display, or any other means for visually displaying information.

User computer device 2102 further includes a touch screen driver 2306 that is maintained in at least one memory device 2304 and that is executed by processor 2302, and temperature sensors 2312 and other sensors 2314 associated with the touch screen and in communication with the processor. To the extent FIG. 23 is intended to show the internal components of user computer device 2102, the temperature sensors 2312 include temperature sensing devices 2110. Depending upon the embodiment, temperature sensors 2312 can include any arbitrary number of temperature sensing devices, and the temperature sensors can include a variety of different types of temperature sensing devices. With respect to the other sensors 2314, these can include any one or more of a variety of different types of sensors. In the present embodiment, the other sensors 2314 can include a capacitive touch sensor and/or a resistive touch sensor or any other type of touch-sensitive component. User computer device 2102 also includes a power supply 2318, such as a power converter for interfacing with a power outlet or a limited life power supply such as a removable and/or rechargeable battery, for providing power to the other internal components 2302, 2304, 2308, 2310, 2312, 2314, and 2316 of user computer device 2102.

Touch screen driver 2306 comprises data and programs that control an operation of touch screen 2104, such as sensing a temperature change in temperature sensitive user interface 2108 of the touch screen and determining a location of a touch on the touch screen, and that may reconfigure an operation of the touch screen as described in greater detail below. In addition to being a temperature sensitive touch screen, touch screen 2104 also may be a 'capacitive' touch screen as is known in the art. For example, touch screen panel 2106, typically an insulator such as glass, may be coated, on an inner surface, with a capacitive user interface 2114 comprising a transparent electrical conductor, such as indium tin oxide (ITO). In other examples of a capacitive touch screen, capacitive user interface 2114 may comprise a grid-type pattern of metallic electrodes that may be embedded in touch screen panel 2106 or etched in a conductor coupled to an inner surface of the touch screen panel. The electrical conductor is, in turn, coupled processor 2302 and is controlled by touch screen driver 2306. Touching the outer, uncoated surface of touch screen panel 2106 with an electrical conductor, such as a human body or a capacitive stylus, results in a change in an electrostatic field and a corresponding change in capacitance that is detected by touch screen driver 2306.

As noted above, touch screen 2104 is a temperature sensitive touch screen, for example, as described in U.S. patent application Ser. No. 12/774,509, entitled "Mobile Device with Temperature Sensing Capability and Method of Operating Same," and filed on May 5, 2010, and which description of a thermally sensitive mobile device touch screen is hereby incorporated herein. Temperature sensitive user interface 2108 may be proximate to an inner surface of touch screen panel 2106 or may be embedded in the panel. For example, the multiple temperature sensing devices 2110 may be embedded in, or may be attached to on an inner surface of, the touch screen panel. Temperature sensing devices 2110 are devices that sense an applied temperature and output an indication of the sensed temperature, such as a thermocouple formed by a respective junction of first and second types of materials, for example, a Indium Tin Oxide (InSnO4) ceramic material (ITO) and a Indium Tin Oxide Manganese ceramic material (ITO:Mn), and may be distributed throughout touch screen 2104 (in a different plane, that is, above or below the capacitive user interface associate with the touch screen, or intermixed with the capacitive user interface).

Certain temperature sensing devices 2110 may be linked to each other by a graphite strip or other thermally-conductive strip so as to maintain the temperature sensing devices at a same or substantially a same temperature, which temperature may be set at a temperature level different from that of an item that will touch screen 2104, such as an exposed finger, a gloved finger, or a stylus. Temperature sensing devices 2110 also may be electrically connected in series to enhance touch sensitivity as well as to enable differential drive functionality. Junctions connected in series result in alternating junction polarities due to thermocouple conductor type order. Junctions in phase are grouped together for additive response and those with opposite polarities are separated and in some cases used to drive opposing device sides for differential response. In yet other cases, opposing polarity junctions are kept at a known and same temperature for reference and are enabled by applying a Graphite type material in their vicinity. By grouping same polarity junctions, touch sensitivity is enhanced. As a result, when two of the temperature sensing devices 2110 that share a same polarity each experience a same temperature, the voltages generated by the temperature sensing devices all tend to increase (or decrease) generally uniformly and tend to be additive, and the resulting output voltage experienced at terminals connected to the temperature sensing devices (which voltage is, in turn, read by processor 2302 implementing touch screen driver 2306) will be the sum of the contributions from those temperature sensing devices. Whereas when two of the temperature sensing devices 2110 that are of opposite polarity each experience a same temperature, a voltage increase (or decrease) generated by one of the temperature sensing device due to the particular temperature will tend to be offset by a corresponding voltage increase (or decrease) generated by the other of the temperature sensing device. Thus processor 2302 is able to determine a location of a touch based on temperature differentials.

Figure 24:
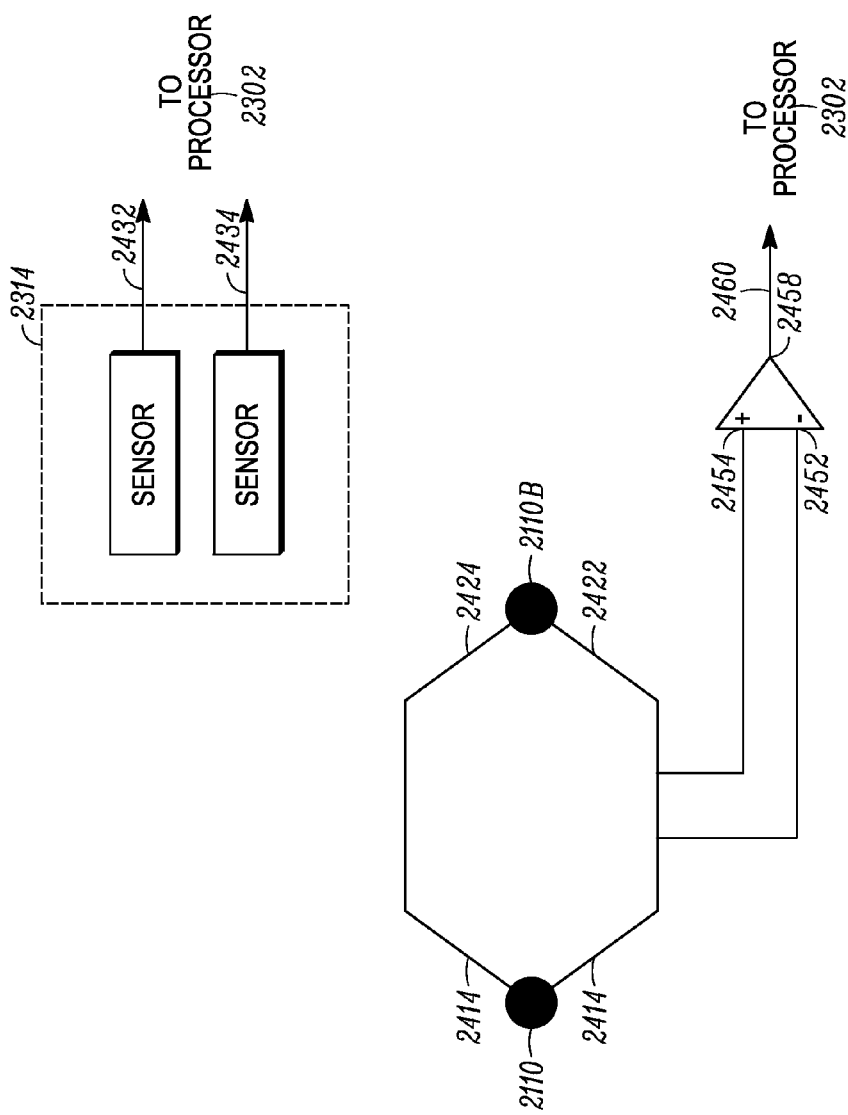
FIG. 24 is an electrical schematic diagram of the example user computer device of FIG. 21.

Turning to FIG. 24, an electrical schematic diagram 2400 is provided showing how signals from temperature sensing devices 2110 can be processed to derive a differential temperature signal, as well as how that differential temperature signal can be processed along with other signals from other supporting sensors 2314, in accordance with an embodiment of the present invention. As shown, two temperature sensing devices 2110 (depicted in FIG. 24 as temperature sensing devices 2110A and 2110B) are coupled in series, between an inverting input 2452 and a non-inverting input 2454 of an operational amplifier 2456. More particularly, a first lead 2412 of a first temperature sensing device 2110A of the two temperature sensing devices 2110A and 2110B, is coupled to the inverting input 2452, a first lead 2422 of a second temperature sensing device 2110B of the two temperature sensing devices 2110A and 2110B is coupled to the non-inverting input 2454, and a second lead 2414 of the first temperature sensing device 2110A is coupled to a second lead 2424 of the second temperature sensing device 2110B. In response to input signals, for example, voltage or current signals, generated by the first and second temperature sensing devices (or groups of devices) 2110A, 2110B, operational amplifier 2456 generates an output signal at output terminal 2458 that is proportional to the differential between the two input signals and thus proportional to the difference in temperatures experienced by the two temperature sensing devices 2110A, 110B.

Additionally as shown in FIG. 24, the differential temperature output signal provided at output terminal 2458 is sent to processor 2302 by way of a communication link 2460 (although not shown, an analog-to-digital converter can be provided as part of communication link 2460 between output terminal 2458 and processor 2302 so that the differential temperature output signal is in digital form when provided to processor 2302). In addition to receiving the differential temperature output signal, processor 2302 also receives one or more signals from one or more other sensors 2314, for example, by way of additional communication links 2432 and 2434, respectively. It should be further noted that, while for simplicity of illustration, in FIG. 23 the temperature sensing circuitry depicted in FIG. 24 are all considered to be part of temperature sensors 2312 (along with the temperature sensing devices 2110A and 2110B), in other embodiments such devices/components other than the specific components that sense temperature can be considered to be distinct from the temperature sensors, and can be located physically apart from the temperature sensors. For example, the operational amplifier 2456 can, in another embodiment, be considered part of the processor 2302. Depending upon the signals provided to it from the temperature sensors 2312 and the other sensors 2314, processor 2302 can determine a variety of operational conditions/contexts as will be discussed in further detail below.

Figure 25:
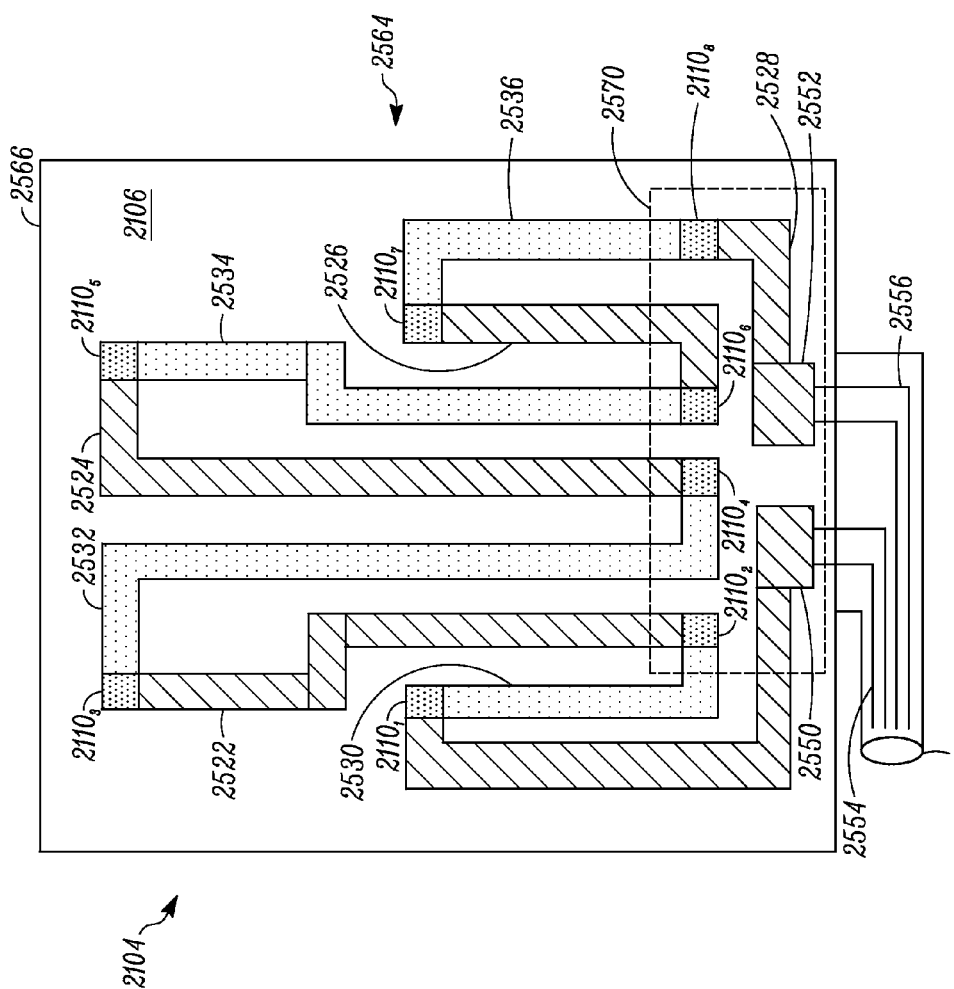
FIG. 25 is a schematic diagram of an example layout of multiple temperature sensing devices of a temperature sensitive user interface associated with the touch screen of the example user computer device of FIG. 21.

Referring now to FIG. 25, a schematic diagram is provided of an exemplary layout of multiple temperature sensing devices 2110 as can be arranged on user computer device 2102 in accordance with an embodiment of the present invention. As illustrated by FIG. 25, each of multiple temperature sensing devices 2110, depicted in FIG. 25 as temperature sensing devices 21101-1108 (eight shown), is a thermocouple formed by a respective junction of an ITO lead and an ITO:Mn lead, and these leads are all interconnected in a manner by which all of the temperature sensing devices 21101-1108 are connected in series between a first terminal 2550 and a second terminal 2552. Further as shown, the first and second terminals 2550 and 2552 respectively are coupled to respective copper wires 2554, 2556 that are surrounded by a flexible plastic sheathe 2558 so as to form a two-wire flex link. Although shown in cut-away, it will be understood that the copper wires 2554, 2556 and sheathe 2558 extend away from the terminals 2550, 2552 and allow those terminals to be coupled to other components (for example, to an operational amplifier that is, in turn, coupled to processor 2302).

More particularly as shown, the first terminal 2550, an ITO lead, is linked to a first temperature sensing device 21101 of the multiple temperature sensing devices 21101-1108 by way of a first ITO lead 2520, and that temperature sensing device is, in turn, linked to a second temperature sensing device 21102 of the multiple temperature sensing devices 21101-1108 by way of a first ITO:Mn lead 2530. A second ITO lead 2522 extends from the second temperature sensing device 21102 to a third temperature sensing device 21103 the multiple temperature sensing devices 21101-1108, and a second ITO:Mn lead 2532 links the third temperature sensing device 21103 to a fourth temperature sensing device 21104 of the multiple temperature sensing devices 21101-1108. A third ITO lead 2524 in turn links the fourth temperature sensing device 21104 to a fifth temperature sensing device 21105 of the multiple temperature sensing devices 21101-1108, which then is connected to a sixth temperature sensing device 21106 of the multiple temperature sensing devices 21101-1108 by way of a third ITO:Mn lead 2534. The sixth temperature sensing device 21106 is, in turn, connected to a seventh temperature sensing device 21107 of the multiple temperature sensing devices 21101-1108 by way of a fourth ITO lead 2526. Finally the seventh temperature sensing device 21107 is connected to an eighth temperature sensing device 21108 by way of a fourth ITO:Mn lead 2536. The eighth temperature sensing device 21108 is linked, by way of a fifth ITO lead 2528, to the second terminal 2552, which is also an ITO lead.

In implementing thermocouple-type temperature sensing devices 2110, the manner in which each temperature sensing device 2110 is interconnected with other components (and the correspondent polarity of the device relative to other components) often is of significance in implementing the temperature sensing device, particularly where multiple temperature sensing devices of this type are connected in series. For example, in an embodiment in which there are two thermocouple-type temperature sensing devices 2110 that are interconnected as shown in FIG. 24, it is typical that the respective polarities of the temperature sensing devices/thermocouples will be oppositely-orientated so as to allow for differential temperature sensing. Given such an orientation, assuming that the two temperature sensing devices 2110 each experience the same temperature, a voltage increase (or decrease) generated by one of the temperature sensing devices due to the particular temperature will tend to be offset by a corresponding voltage increase (or decrease) generated by the other of the temperature sensing devices. Alternatively, assuming that there is a temperature differential between the two temperature sensing devices 2110 such that the two devices output different voltages, the difference between those voltages will be experienced by an operational amplifier across terminals 2550 and 2552.

The embodiment of user computer device 2102 depicted in FIG. 25 is an exemplary embodiment in which multiple temperature sensing devices 2110 are distributed at three different general regions along an inner surface of touch screen 2104 of the user computer device. Notwithstanding the fact that more than two temperature sensing devices 2110 are employed and coupled together in series, it is possible to obtain meaningful temperature information because of the particular manner in which the temperature sensing devices are interconnected. As will be noticed from FIG. 25, each of the temperature sensing devices 21102, 21104, 21106, and 21108 that are located proximate a bottom edge 2562 of touch screen 2104 are formed by the intersection of a respective one of the ITO:Mn leads extending away from the respective temperature sensing device generally upwardly and a respective ITO lead that extends away from each of those respective temperature sensing devices also generally upwardly but to the right of the respective ITO lead for that temperature sensing device (except in the case of the eighth temperature sensing device 2408, from which the ITO lead extends downwardly). By comparison, each of the first and seventh temperature sensing devices 21101, 21107 towards the mid-region 2564 of touch screen 2104 is connected to a respective one of the ITO leads extending away from that temperature sensing device generally downwardly and also to one of the ITO:Mn leads extending generally downwardly and to the right of the respective ITO lead for that device (it is the same for the third and fifth temperature sensing devices 21103, 21105 near the top edge 2566 of touch screen 2104).

Given this type of configuration, the second, fourth, sixth, and eighth temperature sensing devices 21102, 21104, 21106, and 21108 all share a first polarity, while the first, third, fifth, and seventh temperature sensing devices 21101, 21103, 21105, and 21107 all share a second polarity that is opposite the first polarity. Consequently, should a high temperature be experienced generally along the bottom region of the mobile device 2562 proximate the sensing devices 21102, 21104, 21106, and 21108, the voltages generated by those respective temperature sensing devices all tend to increase (or decrease) generally uniformly and tend to be additive, and the resulting output voltage experienced at the terminals 2550 and 2552 will be the sum of the contributions from those four sensing devices. Such reinforcing behavior of the temperature sensing devices 21102, 21104, 21106, and 21108 is particularly facilitated by the presence of the graphite strip 2570. Likewise, if a particular temperature is experienced along the top edge 2566 or the mid-region 2562, then the pairs of temperature sensing devices 21103/1105 and 21101/1107 at those respective locations will tend to generate voltages that are additive and reinforcing of one another, and the resulting output voltage experienced at the terminals 2550, 2552 will be the sum of the contributions of any one or more of those temperature sensing devices.

It should be noted that the configuration of FIG. 25 is reflective of certain assumptions regarding the operation of user computer device 2102. In particular, the arrangement of the multiple temperature sensing devices 21101-1108 presumes that it is unlikely that a user will touch (that is, apply heat proximate to) both one or more of the temperature sensing devices 21102, 21104, 21106, and 21108 near the bottom edge 2562 while at the same time touch one or more of the temperature sensing devices 21101, 21103, 21105, and 21107 at the mid-region 2564 or near the top edge 2566. Rather, typically a user will only touch one or more of the temperature sensing devices near the bottom edge 2562 or touch one or more of the other temperature sensing devices 21101, 21103, 21105, and 21107, but not both. Such an assumption is especially plausible if the placement of some of the temperature sensing devices is at or proximate to a location on user computer device 2102 at which heat is less likely to be applied (for example, near a microphone on a mobile device). Given this assumption, it is unlikely that the voltages generated by the temperature sensing devices 21102, 21104, 21106, and 21108 will be cancelled out by the voltages generated by the temperature sensing devices 21101, 21103, 21105, and 21107 due to touching of the user computer device by a user.

The configuration of FIG. 25 additionally illustrates how, in some embodiments of the present invention, various advantages can be achieved by utilizing multiple temperature sensing devices provided within a given region of touch screen 2104 rather than utilizing only a single temperature sensing device to sense a temperature at a given region of the touch screen. In particular, FIG. 25 shows that multiple temperature sensing devices, such as the devices 21102, 21104, 21106, and 21108 can be collectively employed, effectively as a single 'group sensor,' so as to sense the temperature within a given region of touch screen 2104, that is, proximate the bottom edge 2562 of the touch screen. Likewise, FIG. 25 shows that the multiple temperature sensing devices 21101, 21103, 21105, and 21107 can be collectively employed, again effectively as a group sensor (or as multiple group sensors each made up of two temperature sensing devices), to sense the temperature(s) at either one or both of the mid-region 2564 and proximate the top edge 2566 of touch screen 2104. Insofar as these temperature sensing devices operate as group sensors, temperature changes occurring nearing any of the sensing devices of the group sensor are sensed quickly. This is in contrast to other embodiments where only a single temperature sensing device is present within a given region, such that temperature changes must be communicated to the location of that particular temperature sensing device before those changes are sensed.

Additionally, FIG. 25 illustrates how in some operational conditions it is possible for a variety of different temperature conditions within a variety of different regions of the mobile device can be sensed simply by series-connecting any arbitrary number of temperature sensing devices 2110 and using the simple hardware shown in (or hardware similar to that shown in) FIG. 24. In particular, it will be understood from FIG. 25 that temperature changes experienced proximate the bottom edge 2562 of touch screen 2104 will have twice the effect as temperature changes experienced merely within the mid-region 2564 of the touch screen, since four of the temperature sensing devices are located near the bottom edge 2562 while only two of the temperature sensing devices are located near the mid-region 2564.

Similarly, in other embodiments, by providing different numbers of temperature sensing devices 2110 at different regions of interest around touch screen 2104, the overall voltage signals produced by the series-connection of those temperature sensing devices can be interpreted to determine temperature changes occurring at (and temperature differentials occurring between) those numerous different regions of the touch screen. For example, assuming a hypothetical arrangement in which four temperature sensing devices were located in a first region, for example, a 5 millimeter (mm) circle, and a fifth temperature sensing device was located in a second region, for example, another 5 mm circle, and assuming that all of the temperature sensing devices were connected in series but the fifth temperature sensing device was oppositely connected in terms of its polarity relative to the other four, then temperature changes occurring at the first region would have four times the impact upon the overall output voltage of the five series-connected temperature sensing devices than temperature changes occurring in the second region, and thus the overall output voltage could be interpreted accordingly.

Numerous other embodiments with numerous other types of temperature sensing devices 2110 and configurations thereof are additionally intended to be encompassed by the present invention. For example, sets of multiple temperature sensing devices 2110 positioned proximate to different edges of the touch screen can all be connected in series with one another. Also for example, where a set of temperature sensing devices 2110 are intended to operate as a 'group sensor' associated with a particular region of the touch screen, the proximity of those temperature sensing devices with respect to one another can vary depending upon the embodiment. Further, for example, in some embodiments, one or more temperature sensing devices 2110 can serve as a touch sensor. For example, by placing temperature sensing devices 2110 along sides edges 2124 of user computer device 2102, it is then possible to determine which side of the user computer device is warmer and then conclude that the warmer side is the side that the user is holding.

Further, in some embodiments, sensed temperature information (including sensed temperature information available from groups of sensors) can be interpreted as an indication of keypad entries or other user input signals or instructions. In one embodiment of this type, a first set of temperature sensing devices 2110, for example, 220 temperature sensing devices, can be placed within a first region of touch screen 2104 and serve as a first 'button' while a second set of temperature sensing devices 2110 different in number, for example, one device, can be placed in a second region and serve as a second 'button.' Assuming all of the temperature sensing devices 2110 of the two sets are coupled in series, the user computer device then can detect whether the first region or the second region is touched based upon whether a voltage signal that is detected is large, for example, from the 220 devices, due to heating of the first region from the user's finger, or small, for example, from the one device, due to heating of the second region from the user's finger.

Further, in still other embodiments of the present invention, temperature sensing devices 2110 may be implemented so that thermocouple junctions are situated immediately along the exterior of the touch screen (that is, the junctions just pierce out of the mobile device as "dots"). Such embodiments can provide even more rapid response times, in terms of how fast temperature changes are sensed, than embodiments where the thermocouple junctions are embedded within a touch screen (much less where the junctions are beneath overlying structures). In general, for quickest sensing/response times, it is desirable to minimize the distance between the thermocouple junction and the heat source.

The invention claimed is:
1. A method comprising:
producing at least one analog temperature signal by at least one heat source of an active stylus, wherein the active stylus has an end that comprises the heat source and a signal adjustment mechanism for increasing and decreasing temperature of the at least one analog temperature signal based on a positioning of an input element relative to the end of the active stylus and along a length of the active stylus, and wherein the at least one analog temperature signal is configured to be detectable by at least one thermocouple junction of a device; and transmitting the at least one analog temperature signal from the end of the active stylus for receipt by the at least one thermocouple junction of the device.

2. The method of claim 1, further comprising receiving the at least one analog temperature signal by the at least one thermocouple junction of the device, wherein the at least one thermocouple junction of the device is part of a thermocouple junction network of the device.

3. The method of claim 1, further comprising:
receiving the at least one analog temperature signal at the at least one thermocouple junction of the device;
transforming the at least one analog temperature signal to a digital electric signal; and
inputting the digital electric signal as a parameter of executed processor readable instructions stored on a processor readable storage medium of the device.

4. The method of claim 1, wherein the signal adjustment mechanism for increasing and decreasing the temperature of the at least one analog temperature signal has a power source that provides an amount of current to the at least one heat source, so that increasing the amount of current raises the temperature of the at least one analog temperature signal and decreasing the amount of current lowers the temperature of the at least one analog temperature signal.

5. The method of claim 4, wherein the at least one heat source of the active stylus includes a thermocouple junction.

6. The method of claim 1, further comprising:
outputting at least visual information from a touch screen of the device due to the inputting of the digital electric signal as the parameter of the executed processor readable instructions stored on the processor readable storage medium of the device.

7. The method of claim 1, wherein the signal adjustment mechanism for increasing and decreasing the temperature of the at least one analog temperature signal includes a push button having at least two states for varying the at least one analog temperature signal by at least two different temperatures distinguishable to the at least one thermocouple junction of the device.

8. The method of claim 1, wherein the signal adjustment mechanism for increasing and decreasing the temperature of the at least one analog temperature signal includes a slider having at least two states for varying the at least one analog temperature signal by at least two different temperatures distinguishable to the at least one thermocouple junction of the device.

9. The method of claim 1, wherein the signal adjustment mechanism for increasing and decreasing the temperature of the at least one analog temperature signal includes a knob having at least two states for varying the at least one analog temperature signal by at least two different temperatures distinguishable to the at least one thermocouple junction of the device.

10. An active stylus comprising:
at least one heat source configured to produce at least one analog temperature signal, wherein the at least one analog temperature signal being detectable by at least one thermocouple junction of a device;
an end comprising the at least one heat source, wherein the end is configured to transmit the at least one analog temperature signal for receipt by the at least one thermocouple junction of the device; and
a signal adjustment mechanism for increasing and decreasing temperature of the at least one analog temperature signal based on a positioning of an input element relative to an end of the active stylus and along a length of the active stylus.

11. The active stylus of claim 10, wherein:
the signal adjustment mechanism for increasing and decreasing the temperature of the at least one analog temperature signal comprises a power source that provides an amount of current to the at least one heat source; and
increasing the amount of current raises the temperature of the at least one analog temperature signal and decreasing the amount of current lowers the temperature of the at least one analog temperature signal.

12. The active stylus of claim 10, wherein the at least one heat source of the active stylus includes a thermocouple junction.

13. The active stylus of claim 10, wherein the signal adjustment mechanism for increasing and decreasing the temperature of the at least one analog temperature signal includes a push button having at least two states for varying the at least one analog temperature signal by at least two different temperatures distinguishable to the at least one thermocouple junction of the device.

14. The active stylus of claim 10, wherein the signal adjustment mechanism for increasing and decreasing the temperature of the at least one analog temperature signal includes a slider having at least two states for varying the at least one analog temperature signal by at least two different temperatures distinguishable to the at least one thermocouple junction of the device.

15. The active stylus of claim 10, wherein the signal adjustment mechanism for increasing and decreasing the temperature of the at least one analog temperature signal includes a knob having at least two states for varying the at least one analog temperature signal by at least two different temperatures distinguishable to the at least one thermocouple junction of the device.

* * * * *